United States Patent [19]
Apps et al.

[11] Patent Number: 5,836,390
[45] Date of Patent: Nov. 17, 1998

[54] METHOD FOR FORMATION OF SUBSURFACE BARRIERS USING VISCOUS COLLOIDS

[75] Inventors: John A. Apps, Lafayette; Peter Persoff, Piedmont; George Moridis, Oakland; Karsten Pruess, Berkeley, all of Calif.

[73] Assignee: The Regents of the University of California, Oakland, Calif.

[21] Appl. No.: 745,089

[22] Filed: Nov. 7, 1996

Related U.S. Application Data

[60] Provisional application No. 60/006,320 Nov. 7, 1995.
[51] Int. Cl.$^6$ ..................................................... E21B 33/13
[52] U.S. Cl. ........................................... 166/281; 405/263
[58] Field of Search .................................. 166/281, 282, 166/272.4, 285, 300; 405/50, 258, 263, 264

[56] References Cited

U.S. PATENT DOCUMENTS

| | | |
|---|---|---|
| 3,603,099 | 9/1971 | Zakiewicz ............................... 405/157 |
| 3,638,433 | 2/1972 | Sherard ..................................... 405/50 |
| 3,865,600 | 2/1975 | Pearson et al. ..................... 405/263 X |
| 4,072,019 | 2/1978 | Pearson .................................. 405/264 |
| 4,543,016 | 9/1985 | Tallard ................................... 405/267 |
| 5,403,125 | 4/1995 | Andersen ............................... 405/267 |

*Primary Examiner*—Frank S. Tsay
*Attorney, Agent, or Firm*—Hana Verny

[57] ABSTRACT

A method for formation of subsurface barriers using viscous liquids where a viscous liquid solidifies at a controlled rate after injection into soil and forms impermeable isolation of the material enclosed within the subsurface barriers. The viscous liquid is selected from the group consisting of polybutenes, polysilotanes, colloidal silica and modified colloidal silica of which solidification is controlled by gelling, cooling or cross-linking. Solidification timing is controlled by dilution, addition of brines, coating with alumina, stabilization with various agents and by temperature.

19 Claims, 17 Drawing Sheets

METHOD FOR FORMATION OF SUBSURFACE BARRIERS USING VISCOUS COLLOIDS

This invention was made with Government support under Contract No. DE-AC03-76SF00098 between the U.S. Department of Energy and the University of California for the operation of Lawrence Berkeley Laboratory. The Government has certain rights in this invention.

This application claims benefit of USC. Provisional Appl. No. 60/006,320, filed Nov. 7, 1995.

BACKGROUND OF THE INVENTION

Field of Invention

This invention concerns a method for formation of subsurface barriers using viscous colloids. In particular, this invention concerns formation of subsurface barriers where a viscous colloids gels at a controlled rate after injection into soil so that it forms impermeable isolation of the material enclosed within the subsurface barriers. The viscous colloid is selected from the group consisting of polysiloxanes, polybutenes, colloidal silica, colloidal alumina silica and other modified forms of colloidal silica, of which liquid solidification is controlled by cross-linking, cooling and gelling, timing of which is controlled by dilution, addition of brines, coating with alumina, stabilization with various agents and by temperature.

BACKGROUND ART AND RELATED ART DISCLOSURES

Containment of contaminants or contaminated sites is an ongoing and serious problem to which solutions are being constantly sought.

The development of effective in situ contaminant containment technologies is necessitated by (a) the need to control and/or suppress the release of contaminants from buried sources, (b) the need to prevent the spread of existing plumes, and (c) the inability to effectively remove contaminants from the subsurface. Contaminants from buried wastes or from contaminated soils in the vadose zone can be mobilized and migrate toward previously uncontaminated regions of the aquifer. Underground storage facilities for hazardous wastes may be subject to leakage and/or leaching.

Contaminants cling tenaciously to subsurface materials (especially clays), and traditional physical extraction methods are slow and ineffective. Excavation of contaminated soils and disposal in protected facilities is expensive and often impractical. Containment on-site and control of the groundwater flow pattern can limit the off-site threat, and may supply a long-term solution. In areas where complete control is necessary, impermeable barriers are preferable to sorption barriers. Moreover, a variety of barrier fluid technologies must be developed for different soil and waste-type conditions.

Despite the obvious need, containment technologies have been largely limited to expensive "brute-force" approaches involving trenching, and cut-off and slurry walls. The applicability of these methods is restricted to cases of lateral movement of contaminants, and their effectiveness is limited due to practical considerations. Currently there is no effective technology to prevent the downward migration of wastes toward deeper and uncontaminated parts of the subsurface.

It would, therefore, be advantageous to provide practical and economical containment methods with broad applicability in a large variety of sites which could be applied without excavation in areas afflicted by a wide range of contaminant problems (ranging from immiscible organic contaminants to solutes to heavy metals to mixed wastes) on both a temporary and permanent basis.

Permanent barrier systems for contaminant isolation are merging as an alternative to treatment or disposal of contaminated soil. "In situ Permeability Reduction and Chemical Fixation Using Colloidal Silica", in *Proceedings of the Sixth National Outdoor Action Conference on Aquifer Restoration*, May 11–13, 1992, Las Vegas, Nev.; "Evaluation of a Montan-Wax Emulsion for Constructing Subsurface Barriers", in *Proceedings of ER '93 Environmental Remediation Conference*, Augusta, Ga., Oct. 24–28, 1993, pages 1037–1042; "New Barrier Fluids for Containment of Contaminants", in *Proceedings of ER '93 Environmental Remediation Conference*, Augusta, Ga., Oct. 24–28, 1993, pages 941–948.

Use of colloidal silica for blocking flow in porous media originated in the petroleum industry and is described, for example, in U.S. Pat. No. 4,732,213 related to a process for selectively plugging subterranean leaks by injecting an aqueous solution of nonaggregated colloidal silica. Other related information is found in "Oilfield Applications of Colloidal Silica Gel", *SPE Reservoir Engineering*, (November 1991), pages 406–412; and in *Fluid Diversion and Sweep Improvement with Chemicals Gels in Oil Recovery Processes*, Bartlesville Project Office, U.S. DOE report DOE/BC/14447-8, (June 1991), and has recently been transferred to the field of environmental protection as described in "Current Chemical Grout Engineering in Japan", *Grouting, Soil Improvement, and Geosynthetics*, pages 725–736, Geotechnical Special Publication No.30, American Society of Civil Engineers, (1992).

Because treatment often involves mobilization of contaminants, temporary barriers are also proposed to prevent the spread of contaminants during treatment operations. Vertical barriers, or cut-off walls, can be formed by slurry trenching or jet grouting, in which the soil is replaced with a clay or cementitious material. Formation of horizontal bottom barriers is more difficult because barrier material must be emplaced remotely.

Grout placement is critical to the formation of injectable barriers. When grout is injected into the subsurface, consideration must be given to the likelihood that the grout plume will move before it solidifies or gels. This problem was previously studied and described in *Chemical Grouting*, 2nd Ed., Prentice-Hall, Englewood Cliffs, N.J., Chapter 5 (1992). The paper demonstrated the effect of flowing groundwater on the ultimate shape and location of a plume of cement grout injected into saturated sand.

In this respect, the effects of gravity and capillarity are important. Essentially, the injected grout plume is drawn downward by gravity and is dispersed by capillarity; both effects continue at decreasing rates as the viscosity of the grout increases and as the grout changes from a Newtonian liquid to a non-Newtonian liquid and finally solidifies. The time scale of these changes referred to as gel time, must be slow enough to allow complete injection without excessive injection pressure which would uplift the formation (generally limited to 20 Kpa per meter of depth [1 psi per foot]) and fast enough to solidify the plume in its intended location.

However, none of the so far known attempts to provide containment by forming a permanent barrier for contaminant isolation was successful because of the specific requirements for such containment and also because physical and chemical properties of agents used for such barriers prevented the successful containment of contaminated sites.

It would, therefore, be advantageous to have an available method and means for providing an impenetrable containment subsurface barrier able to prevent leakage of containment from the contaminated site, which would be permanent and practical and easy to manipulate to design its precise emplacement.

It is, therefore, a primary objective of this invention to provide a permanent subsurface barrier for containment of contaminants and for isolation of contaminated sites using viscous liquids.

All patents, patent applications and publications cited herein are hereby incorporated by reference.

SUMMARY

One aspect of the current invention is a method for formation and emplacement of subsurface barriers using viscous liquids.

Another aspect of the current invention is a method for formation and emplacement of subsurface barriers using either colloidal silica, modified forms of colloidal silica, polysiloxanes, or polybutenes.

Yet another aspect of the current invention is a method for formation in situ impermeable barriers by emplacement of viscous liquid selected from the group consisting of polybutenes, polysiloxanes, colloidal silica and modified colloidal silica, into a subsurface and solidifying said barrier by cooling cross-linking or gelling, wherein the solidification is controlled by temperature, dilution, addition of brines, coating with alumina, and stabilization with various agents.

Still another aspect of the current invention is a method to control the gel time of colloidal silica and polysiloxane grouts.

Still yet another aspect of the current invention is a method to prevent rapid gelling of colloidal silica grout that occurs when it is injected into certain common types of soil, particularly but not exclusively, those that contain exchangeable divalent ions.

Still yet another aspect of the current invention is a stabilized colloidal silica, or polysiloxane grout capable of gelling and cross-linking and forming impermeable subsurface barriers, or a polybutene grout solidifying into the subsurface barriers upon cooling.

DEFINITIONS

As used herein:

"Grout" means a liquid, the viscosity of which is initially sufficiently so low that it can be injected into soil, which liquid gels or solidifies in a controllable time.

"Hanford soil", "Hanford sand", "ESQ sand" and "GFA soil" means soils obtained from the Hanford Reservation in Washington (Hanford soil or sand), from a quarry east of Sacramento, Calif. (ESQ sand), and from a quarry near Los Banos, Calif. (GFA soil), respectively.

"Colloidal silica" means a standard alkaline colloid available as Nyacol® 1440, which can be gelled by the addition of NaCl brine and also includes a newly developed alumina-modified colloid Nyacol® DP5110 which can be gelled by the addition of $CaCl_2$ brine. Nyacols were obtained from Eka-Nobel, Marrietta Ga.

"Polysiloxane" or "PSX" is a divinyl-terminated polydimethylsiloxane able to solidify upon cross-linking. Cross-linking occurs at the vinyl terminations in the presence of a catalyst, platinum. The initial viscosity of the grout is determined by the polysiloxane chain length and the rate of gelling is determined by the concentration of catalyst. To meet the requirement for low initial viscosity, a new product was formulated and designated 2-7154-PSX-10 with catalyst 2-0707, both commercially available from Dow Corning, Midland, Mich.

"Solidification" means changing from the liquid flowable phase to non-flowable phase. Solidification can be brought about by cross-linking, gelling and cooling.

"Polybutenes" means and includes polybutenes of molecular weight from about 400 to about 100,000.

"Gel-time" means the amount of time between the time when ingredients are mixed and the time when the liquids become too viscous to inject or when the solidification process has advanced to when the liquid can no longer be injected.

DETAILED DESCRIPTION OF THE INVENTION

The current invention concerns a development and design of new types of viscous liquid grouts able to solidify by gelling, cooling or cross-linking and form impermeable subsurface barriers or structures which isolate and/or contain various materials within. These grouts are typically liquids which, when set in a porous media, exhibit near-zero permeability due to temperature effects, such as polybutanes, gelling, such as colloidal or modified colloidal, silica, or cross-linking such as polyxiloxanes. These solidified liquids are able to contain the contaminated zone in the subsurface by entrapping and isolating the contaminant source and the plume within a chemically inert barrier.

I. Formation and Emplacement of Subsurface Impermeable Barriers

The viscous liquids of the invention, when injected into the subsurface, produce inert nearly impermeable barriers through a very large increase in viscosity or through solidification.

Appropriate emplacement of these substances provides an effective containment of the contaminated zone by entrapping and immobilizing both the contaminant source and the plume.

Figure 1:
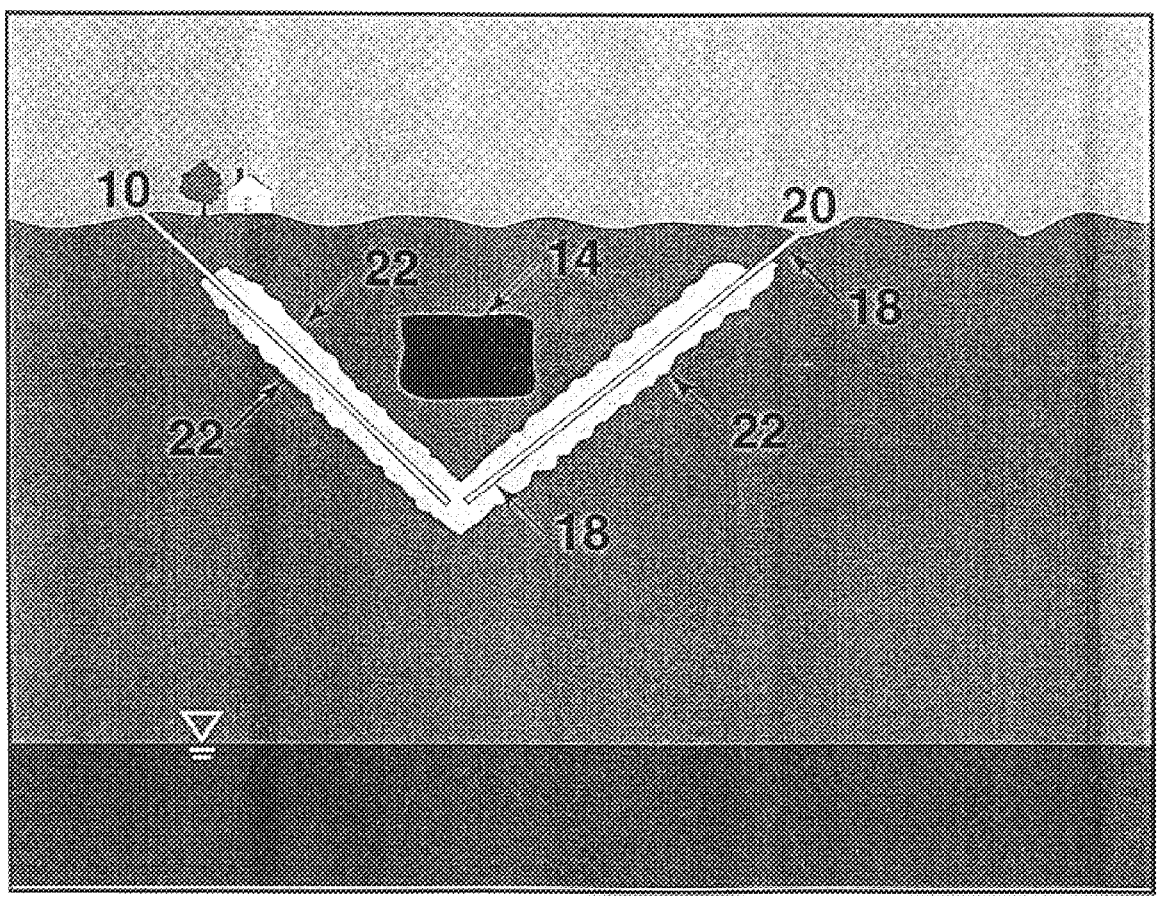
FIG. 1 illustrates a schematic of bottom barriers emplaced under buried waste through inclined wells.
Figure 2:
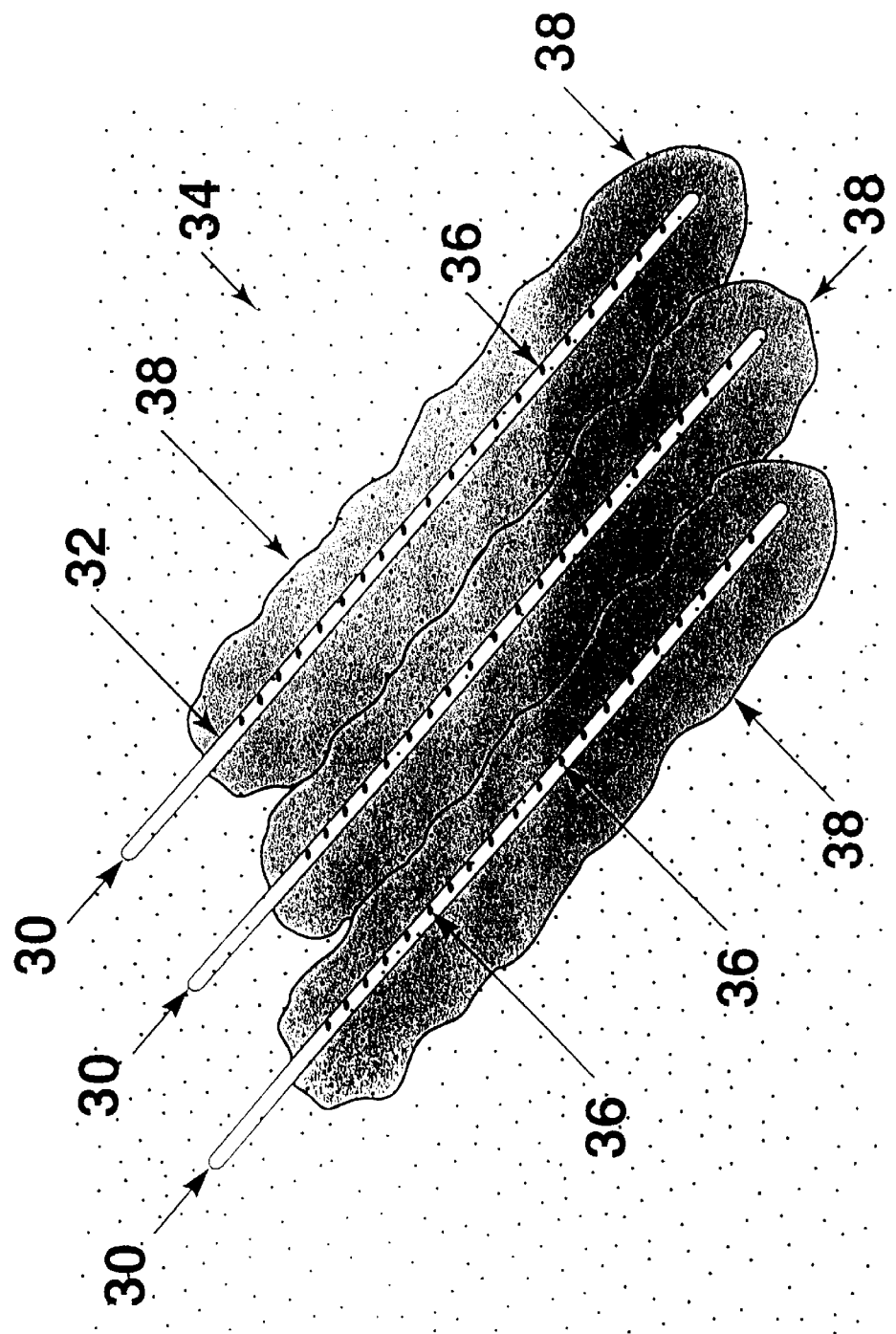
FIG. 2 is a schematic showing how plumes of grout, injected through horizontal wells, merge to form a continuous barrier.

Emplacement of the injectable barriers is illustrated in FIGS. 1 and 2, where the viscous liquids are injected into the soil through inclined (FIG. 1), horizontal (FIG. 2) or vertical wells and solidify in place.

FIG. 1 is a schematic of a bottom barrier emplaced under buried waste (14) through inclined wells 10 and 20. In this instance, low viscosity liquid (18) is injected through inclined wells 10 and 20 and gels in place forming an impermeable barrier (22).

FIG. 2 is a schematic illustration of the emplacement of formation of injectable barriers. In this instance, barrier fluid(s) (32) are injected at pressures below lithostatic so as not to fracture the formation or cause surface uplift. Fluid (32) is injected into the porous formation (34) through horizontal wells (30) containing perforations (36) and permeates the formation to form "plumes" (38). These are geometrical regions in which the pore space is saturated to some degree, up to full saturation, with the barrier fluid. The fluid then solidifies in place. Several injected plumes are emplaced to form a continuous horizontal barrier in situ.

The above described barriers are suitable for emplacement by injection in the vadose (unsaturated) zone of the subsurface. In this application, the effects of gravity and capillarity are important. When grout is injected into the vadose zone, it slumps under the influence of gravity and redistributes due to capillary forces as it solidifies. However, with modifications, the principles described herein are also suitable for emplacement of these barriers in the saturated zones of the subsurface.

If the barrier fluid is polybutene, it is injected into the subsurface at an elevated temperature and an impermeable solid forms after cooling.

If the barrier fluid is polysiloxane, it is injected into the subsurface at ambient temperatures and an impermeable solid forms after cross-linking.

If the barrier fluid is colloidal silica, it is injected at an ambient temperature and an impermeable solid forms after gelling.

Control of the time for solidification is an essential component of the process because premature or late solidification may result in incomplete coverage of the pore space and thus reduce the effectiveness of the barrier formation and impermeability. Solidification time must be controllable in such a way that viscosity of the barrier fluid will remain low for period of time required for injection of the barrier, but to function as a barrier it must be able to change from the liquid to solid once it is in place. Additionally, during injection, the viscosity must be low enough to avoid high injection pressures which could uplift or fracture the formation.

The containment according to the invention is achieved by creating a permanent immobilization of the contaminants in the affected aquifer region by sealing and entombing it in a monolith of inert and impermeable material.

Another way to achieve the containment is to create an impermeable cage or box to surround and isolate the contaminated area, which can be treated at a later time.

Such a cage enhances and make possible the use of remediation techniques, such as soil flushing, which currently face regulatory approval problems due to concerns about contaminants escaping into previously unaffected areas of the subsurface.

Finally, the application of the invention involves sealing of permeable aquifer zones, so that the in situ remediation techniques are directed to contaminated zones.

II. The Viscous Liquids Used for Formation and Emplacement of Barriers

The barrier liquids, such as polybutenes, colloidal or modified colloidal silica and polysiloxanes are used as basic viscous liquid materials, according to the invention. Their properties are described in Example 1.

One type of barrier fluid is colloidal silica (CS), which is a silica-based gelling chemical grout. Colloidal silica comprises colloidal or modified colloidal silica of different particle sizes, stabilized as basic or neutral pH. An example of suitable colloidal silica is colloidal alumina silica. The colloidal silica grout has excellent durability characteristics, poses no health hazard, is unaffected by filtration, is chemically and biologically benign, and is injected isothermally. The solidification, measured by changes in viscosity and elasticity in the CS type of fluids, is provided by a gelation process.

For impermeable barrier formation, the CS is injected into the subsurface at ambient temperatures. The sealing of contaminated site is achieved by gelling the colloidal silica when the barrier forms after a controlled gel time. Control of gel time is an essential component of the process because premature gelation may result in incomplete coverage of the pore space and thus reduce the effectiveness of the containment.

The second type of barrier fluid belongs to the polysiloxane (PSX) family, which includes crosslinked polymers similar to rubbers. PSXs are chemically and biologically inert silicone-based polymers, and are largely unaffected by the aquifer or waste chemistry.

The second type of liquid barrier changes from a viscous liquid to an elastic solid by a vulcanization-like process which results in the cross-linkage of the injected substances and the formation of a solid matrix. The cross-linking process is achieved by controlling the amounts of the catalyst, of the crosslinker, and if needed, of the retardant. As in the case of gelling barrier liquids, control of the crosslinkage time is vital.

The third type of barrier belongs to the polybutene (PB) family of liquids the viscosity of which is exceeding sensitive to temperature. The solidification of these compounds is produced by cooling.

Injectable viscous liquid materials were formulated or kept under the temperature condition in case of polybutene to meet the requirements of low initial viscosity and controllable gel-time in soil. The initial viscosity of CS and PSX was 5 and 10 centipoise (cP) respectively, which allows easy injection with conventional equipment.

To develop grout formulas, various concentrations of a curing agent were added to the CS, PB or PSX, and solidification was monitored. The principal problems to be overcome for CS grout were premature gelling caused by chemical interaction between the grout and the soil, and acceleration of gel time caused by dyes that would be used to detect grout plumes in the soil. For PSX grout, the soil also accelerates gelling, but to a lesser degree, and the effect of soil can be compensated for by reducing the amount of catalyst.

III. Chemical Grouts

The barrier fluids used in this invention represent a new generation of chemical grouts. Chemical grouts are generally prepared by mixing two or more liquids, such as viscous liquid and a brine or a catalyst or retardant or making a mixture of the viscous liquid catalysts, retardants, and other additives and ingredients. Examples of these mixtures are colloidal silica and brine, colloidal silica and a mixture of two or more brines, a polysiloxane and the catalyst, polysiloxane and the retardant, polysiloxane and the catalyst and the retardant. The polybutene typically is a single component of grout. The resulting mixture changes from a liquid to a solid state during some period of time. The grout is typically injected only until a certain time, referred to as gel-time, has elapsed. The process of solidification, caused by gelling or cross-linking, begins as soon as the ingredients are mixed. In case of polybutenes gel-time depends on the rate of cooling.

The creation of barriers in the unsaturated zone of the subsurface imposes special requirements on the gel-time of the barrier liquids. After injection, the forces acting on the plume of the injected barrier liquid are gravity and capillarity, both of which result in the redistribution of the grout. Gravity causes the downward migration of the plume as well as spreading by dispersion, while capillarity tends to spread the plume.

The gel-time of the barrier liquids has to be within a certain time window. The time window must be long enough to allow comfortable emplacement and prevention of premature gelling, but sufficiently short to prevent excessive redistribution and reduction in the soil saturation.

For operational simplicity, and to allow grout emplacement using commonly available equipment, in the field testing the ingredients of the barrier fluids for the field test injections were not mixed in-line but were premixed as a batch. Formulas for CS and PSX premixed materials were developed to meet a design criterion of a minimum of a 2-hour gel-time. That is, the barrier liquids were to remain sufficiently mobile to allow injection for at least two hours after mixing.

To confirm the injectability of grout in the field, gel-time tests were conducted both with and without soil, followed by grout injection into one-dimensional sandpacks. Grout gel-time was measured by the method described in Example 2. Qualitative observations of fluidity were made periodically until the grout solidified. A number ranging from 1 to 11, as summarized in Table 1, was assigned to each gel state of a grout. This method is referred to here as jar testing. To determine the effects of the soil upon the gelling rate, the jar tests were conducted without soil and with various amounts of soil.

TABLE 1

Jar-Test Gel State Codes
Modified from Sydansk (1990)

| | |
|---|---|
| 1. | No detectable gel formed. The gel appears to have the same viscosity (fluidity) as the original polymer solution and no gel is visually detectable. |
| 2. | Highly flowing gel. The gel appears to be only slightly more viscous than the initial polymer solution. |
| 3. | Flowing gel. Most of the obviously detectable gel flows to the bottle cap upon inversion. |
| 4. | Moderately flowing gel. A small portion (about 5 to 15%) of the gel does not readily flow to the bottle cap upon inversion- usually characterized as a tonguing gel (i.e., after hanging out of the bottle, gel can be made to flow back into the bottle by slowly turning the bottle upright). |
| 5. | Barely flowing gel. The gel slowly flows to the bottle cap and/or a significant portion (>15%) of the gel does not flow upon inversion. |
| 6. | Highly deformable nonflowing gel. The gel does not flow to the bottle cap upon inversion (gel flows to just short of reaching the bottle cap). |
| 7. | Moderately deformable nonflowing gel. The gel flows about halfway down the bottle upon inversion. |
| 8. | Slightly deformable nonflowing gel. Only the gel surface deforms slightly upon inversion. |
| 9. | Rigid gel. There is no gel-surface deformation upon inversion. |
| 10. | Ringing rigid gel. A tuning-fork-like mechanical vibration can be felt or a tone can be heard after the bottle is tapped. |
| 11. | Rigid gel no longer ringing. No tone or vibration can be felt or heard, because natural freguency of the gel has increased. |

The purpose of the jar gel-time tests was to determine whether (i) the barrier fluids could be injected into the soil, and (ii) gel-time could be controlled within the feasibility window, described above, sufficiently long enough to prevent premature gelling while short enough to prevent excessive drainage and redistribution. These tests were followed with the next level of column injection tests in larger diameter columns, aimed to confirm the results of the gel-time tests under increasing length scales. In these tests, grout was injected vertically into a column of test soil, and the injection pressure was monitored using a Validyne DP-15 pressure transducer, measuring differential pressure relative to atmosphere.

For the test, simulation of the average rate of grout injection was designed where 1 m$^3$ of grout was to be injected during a two-hour period. Under ideal conditions at a porosity of $\phi=0.36$, as measured in sandpacks, this would produce a completely saturated spherical bulb of radius 0.87 m. To simulate the average of grout injection front advance, the sandpacks were 0.87 m long and the barrier liquids were pumped through at a rate of 0.5 pore volume (PV) per hour. Injection pressure was plotted against time.

A rapid increase in the liquid pressure before the grout breakthrough indicates premature solidification and, under field conditions, would result in a reduced radius of the grouted bulb. Successful grout breakthrough through the sandpack under injection pressure below 20 psi and subsequent gelation of the grout in the sandpack indicates attainment of the design radius of coverage both in the laboratory and the field.

Jar tests and column tests offer a fast, easy, and convenient means of estimating the gel-time, especially when comparing gelling rates in systems with and without soil. They cannot, however, provide the quantitative data needed for reliable prediction, including numerical simulation, of grout injection and gelling behavior. Such quantitative data were, therefore, obtained from viscosity measurements.

IV. Design of Grouts with Controllable Gel Times in Soil

A. Colloidal Silica

Colloidal silica is produced from saturated solutions of silica by formation of Si—O—Si (siloxane) bonds, splitting out water between two molecules. Repeated accretion of molecules by this mechanism results in the formation of particles, the size of which can be controlled in the range of 2–100 nm. Uncombined SiOH (silanol) groups remain on the particle surface. Gelling of colloidal silica occurs when particles approach each other and form siloxane bonds between particles.

Colloidal silica gelling can be induced by addition of a gelling agent. All electrolyte solutions, also called brines, are very effective, readily available, and inexpensive gelling agents. Any and all of these electrolyte solutions are suitable to be used and intended to be within the scope of this invention. The brines tested with the various CS products included NaCl, KCl, NaCl/NaF mixtures, and $CaCl_2$.

The tested CS grouts were composed of 5 parts (by volume) of colloid and 1 part (by volume) of brine. This volume ratio was chosen as a compromise between the desire to produce the strongest gel by maintaining the solids content of the gel as high as possible, and the necessity to avoid very high local salinity which could cause the instantaneous formation of a floc, an undesirable product. Gel time was assessed by plotting the gel state against time, and/or by comparing the relative magnitudes of G' and G". As shown in Table 1, gel state is a qualitative observation of the grout fluidity.

For emplacement as depicted in FIGS. 1 or 2, it is essential that (1) the viscosity of the grout be low enough initially, (2) the viscosity remain low long enough for the full grout plume to be emplaced, and (3) the grout gels in a desired "design" gel time. It is also necessary for separate grout plumes to merge seamlessly to form a complete barrier, and for the permeability of the grouted material to be low enough to prevent contaminant transport. To satisfy the requirement for controllable gel-time, experiments to control the gelling rate of CS grouts were performed both in the absence of soil using jar tests and viscometry, and in the presence of soil using jar tests with soil and column tests, as described above and in Examples.

Figure 3A:
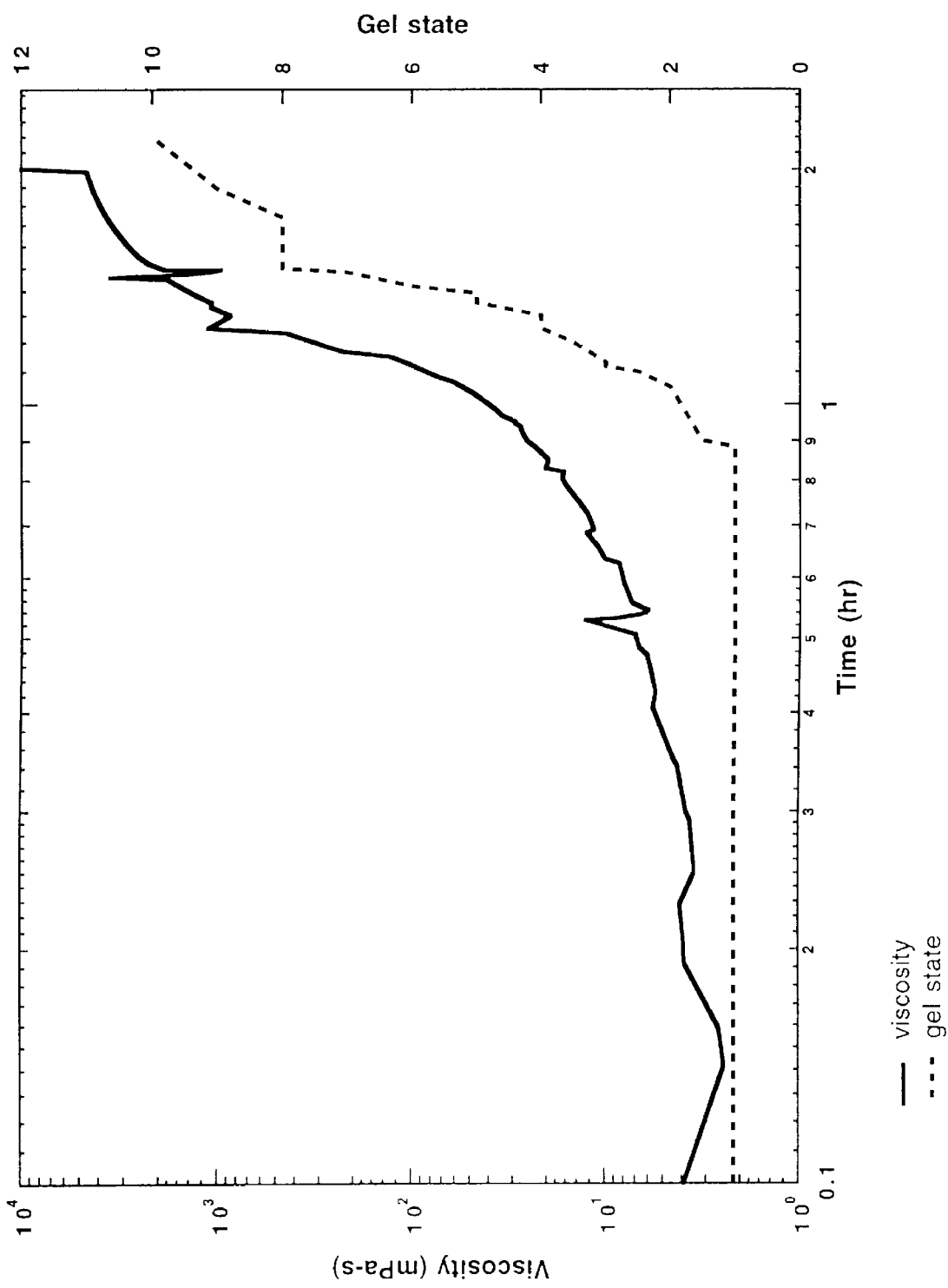
FIG. 3 is a graph showing changes in viscosity during gelling of colloidal silica grout.
Figure 3B:
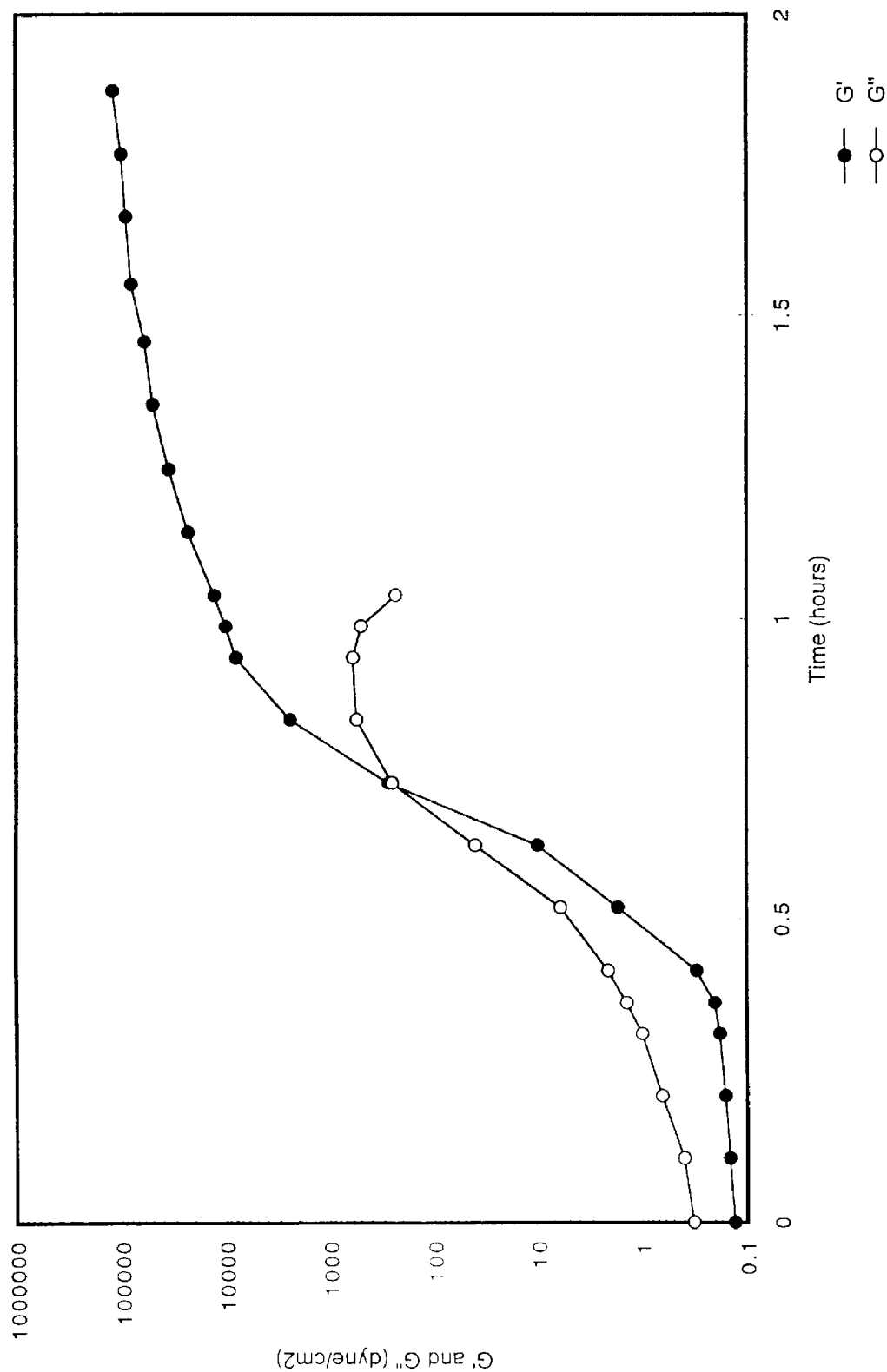

Rheological performance is seen in FIG. 3 which illustrates rheological performance of a Nyacol 1440 CS grout in a mixture with an NaCl brine. Rheological performance is evaluated in terms of viscosity observed during gelling of a colloidal silica grout. The colloidal grout used in FIGS. 3A and 3B consisted of 5 parts of volume Nyacol 1440 colloidal silica and 1 part NaCl solution (70 g/L). The pH after brine addition was 9.03.

FIG. 3A shows the contraves Couette viscometer data and visual assessment of gel state. Viscosity of the grout is expressed in units of multiple-seconds. One mpa-s equals one centipoise (mPa-s). The gel state corresponds to the gel state listed in Table 1.

FIG. 3B shows Rheometrics dynamic mechanical spectrometer data, separating viscous (G") and elastic (G') components of viscoelasticity.

Control of Gel Time for Colloidal Silica Grout in the Absence of soil

The gel time is affected by the pH, amount of solids in the suspension, particle size, and brine concentration. In FIG. 3, gel-state data and viscosity data, measured by two different methods, were plotted for the same grout formula, so that the various forms of data could be compared.

Viscosity data were developed using a Contraves viscometer and a Rheometrics dynamic mechanical spectrometer. The Contraves viscometer shears the liquid at a steady controlled rate in an annular cylindrical gap (Couette flow) and measures the resulting stress. The dynamic mechanical spectrometer imposes a sinusoidally varying strain upon the liquid. For a Hookean elastic solid, the stress is proportional to, and in phase with, the imposed strain. For a Newtonian viscous liquid, the stress is proportional to, and in phase with, the rate of strain, and hence 90° out of phase with the strain. For a general viscoelastic material, the stress is characterized by a phase angle which lies between 0° and 90°. Designations G' and G" are used for storage and loss moduli (units of stress) related to this phase angle, representing respectively the elastic and viscous components of the stress. The two moduli are equal when the phase angle is 45°, and this is conventionally taken as the gel time. Until the modulus $G' \geqq 10$ G" modulus, the liquid is considered and treated as viscous.

Comparison of the sets of data shown in FIGS. 3A and 3B shows that the suspension increases in viscosity and effectively is no longer injectable, before it reaches gel state 2.

Effects of Soil on Colloidal Silica Gel Times

When the grout is injected into soil, chemical interactions can change the aqueous grout chemistry, which affects, typically accelerates, the gelling rate. Grout gel time curves showing the effect of addition of Hanford soil are shown in FIG. 4.

Figure 4:
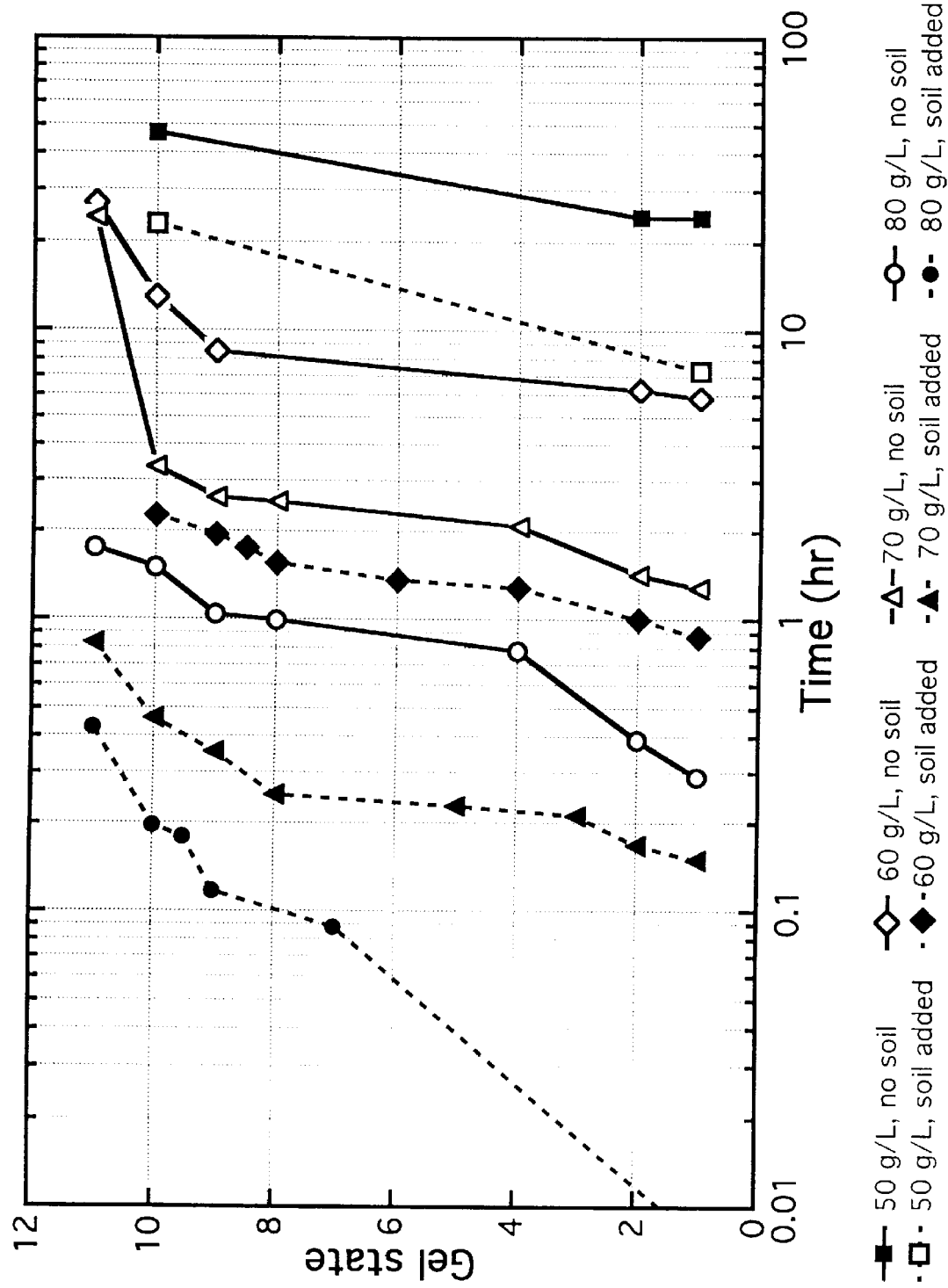
FIG. 4 is a graph illustrating the effect of Hanford soil on gelling of a colloidal silica grout.

FIG. 4 shows the effect of Hanford soil on gelling of a colloidal silica grout. Visual assessment of gel state was used to monitor the gelling of four grout mixtures, containing brine concentrations ranging from 50 to 80 g/L NaCl. Solid lines show time of gelling of a colloidal silica grout containing varying concentrations of brine (50, 60, 70, and 80 g/L), pH 8.9, without soil. Broken lines show gelation time of the same grout with added soil. As seen from FIG. 4, the greater the salinity or ionic strength of the brine gelling agent, the faster the colloid gels (solid lines). Gel-time was substantially shortened when the grout was in contact with the soil.

During development and testing of this invention, it was discovered that grouts containing NaOH stabilized colloidal silica and NaCl brine, invariably gelled faster in the presence of Hanford soil than in its absence. Similar acceleration of gelling was found with several other soils tested. The soil properties that affect the gelling rate of colloidal silica grout are the amounts of calcium carbonate and smectites in the soil, and the potential to release large concentrations of calcium and other divalent cations that are absorbed on the clays.

Such acceleration is caused by the following mechanism. The Na ions in the grout are exchanged for Ca or other divalent ion absorbed on clay particles in the soil. This replacement of Na by Ca ions results in uncontrolled rapid gelling. Worse yet, even if no NaCl brine at all is added to the CS, the grout still gels uncontrollably when injected into soil. This occurs because the colloidal silica itself contains Na ions necessary to stabilize the colloid at high pH.

The above-described mechanism of gel-acceleration was confirmed by several experiments in which grout was injected into columns packed with soil, and the injection pressure was measured. Injection pressure is a good indicator of gelling. When the injection pressure is measured in excess of that required to cause viscous flow of the grout through the soil, gelling or premature gelling is indicated.

Preflushing the Soil With NaCl to Prevent Premature Gelling

One way to solve this problem is to eliminate the divalent cations, such as calcium ions, from the soil by preflushing. Results of the experiments showing preflushing are seen in FIG. 5.

Figure 5:
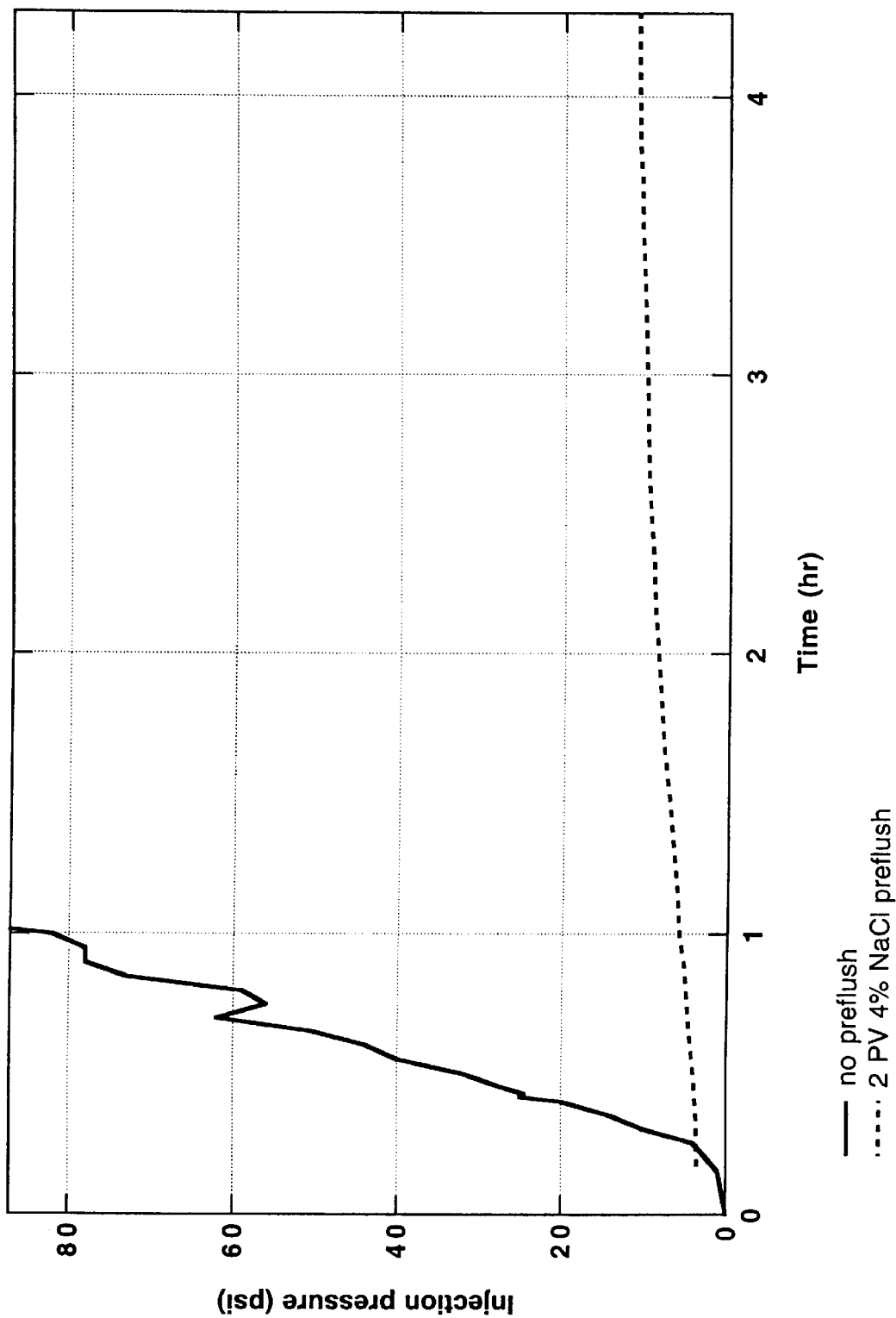
FIG. 5 is a graph showing the effect of displacing calcium ions by preflushing with sodium chloride brine.

The solid line in FIG. 5 shows the pressure required to inject grout through a column packed with Hanford sand. When Nyacol 1440 was injected, even though no NaCl brine had been added to cause gelling, it gelled rapidly upon contact with the sand, so that excessive injection pressure was needed.

The (Δ-Δ-) line in FIG. 5 shows the pressure required to inject grout through a column packed with Hanford sand. In this case the column was preflushed with 2 pore volumes of 4% NaCl and 1 pore volume of 1% NaCl before injection of grout, and the injected grout contained 20% by volume of 6% NaCl. In this case, as seen, only moderate injection pressure was required, and injection was continued for 4 hours during which time the grout was injected all the way through the solid column. Effluent emerging after 2 hours contained grout and gelled. Injection continued for 2 more hours without premature gelling. No premature gellation occurred because the preflush displaced effectively all the Ca ions out of the column before the grout was injected.

The experiments shown in FIG. 5 shows that the Ca ions were the cause of premature gelling, and that preflushing effectively eliminated the problem of premature gelling. The preflushing of the soil effectively solves the premature gelling problem.

However, preflushing is not acceptable in situations where it would mobilize contaminants already in the soil. For this reason, other techniques were investigated in order to develop a colloidal silica system that would gel controllably in soil but would not require preflushing.

Use of Diluted Colloidal Silica

The problem of premature gelling is overcome with diluted colloidal silica. Results of diluted colloidal silica used as the preflush are seen in FIG. 6.

Experiments testing the effect of diluted colloidal silica show that when CS (Nyacol 1440), with no added brine, was infiltrated by gravity into vertical columns of Hanford soil, it gelled so rapidly that it could not penetrate even 0.3 m (1 ft) through the sand column. However, when the same colloid was diluted and infiltrated, the colloid penetrated further, and the resulting effluent had both sufficient solids content and divalent ions to gel within a few days. This gel was noticeably weaker than the gel produced by full-strength colloid and added brine. This suggested that a diluted colloid could be used as a preflush that could both displace divalent ions, such as calcium, but that it also gels. A diluted-colloid preflush thus becomes the front part of the barrier, and allow a stronger grout to be injected later, as the main part of the barrier.

Figure 6:
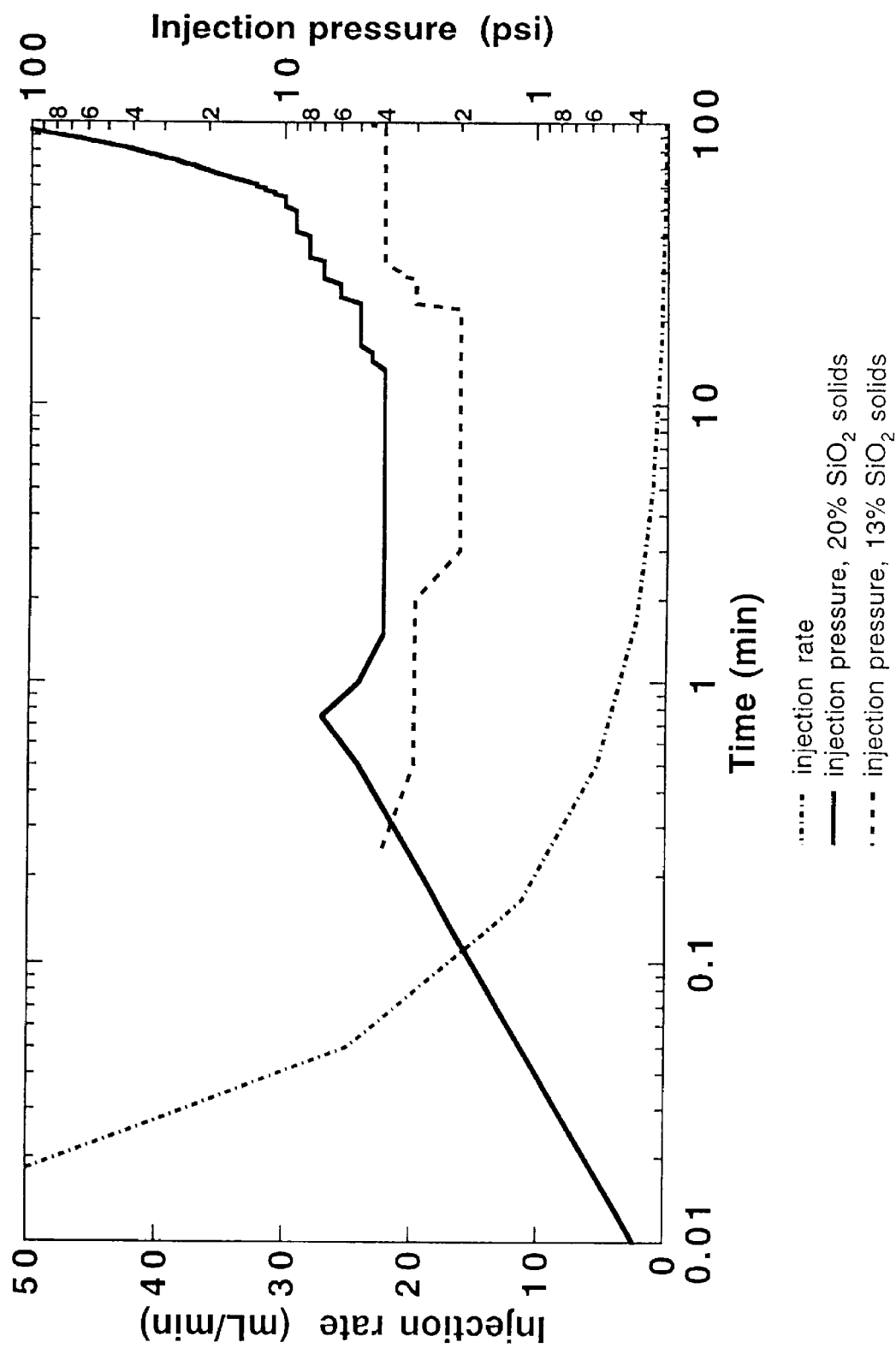
FIG. 6 is a graph showing the effect of diluting the colloidal silica without added brine from 20% $SiO_2$ to 13% $SiO_2$ on the pressure required to inject the colloidal silica.
Figure 13:
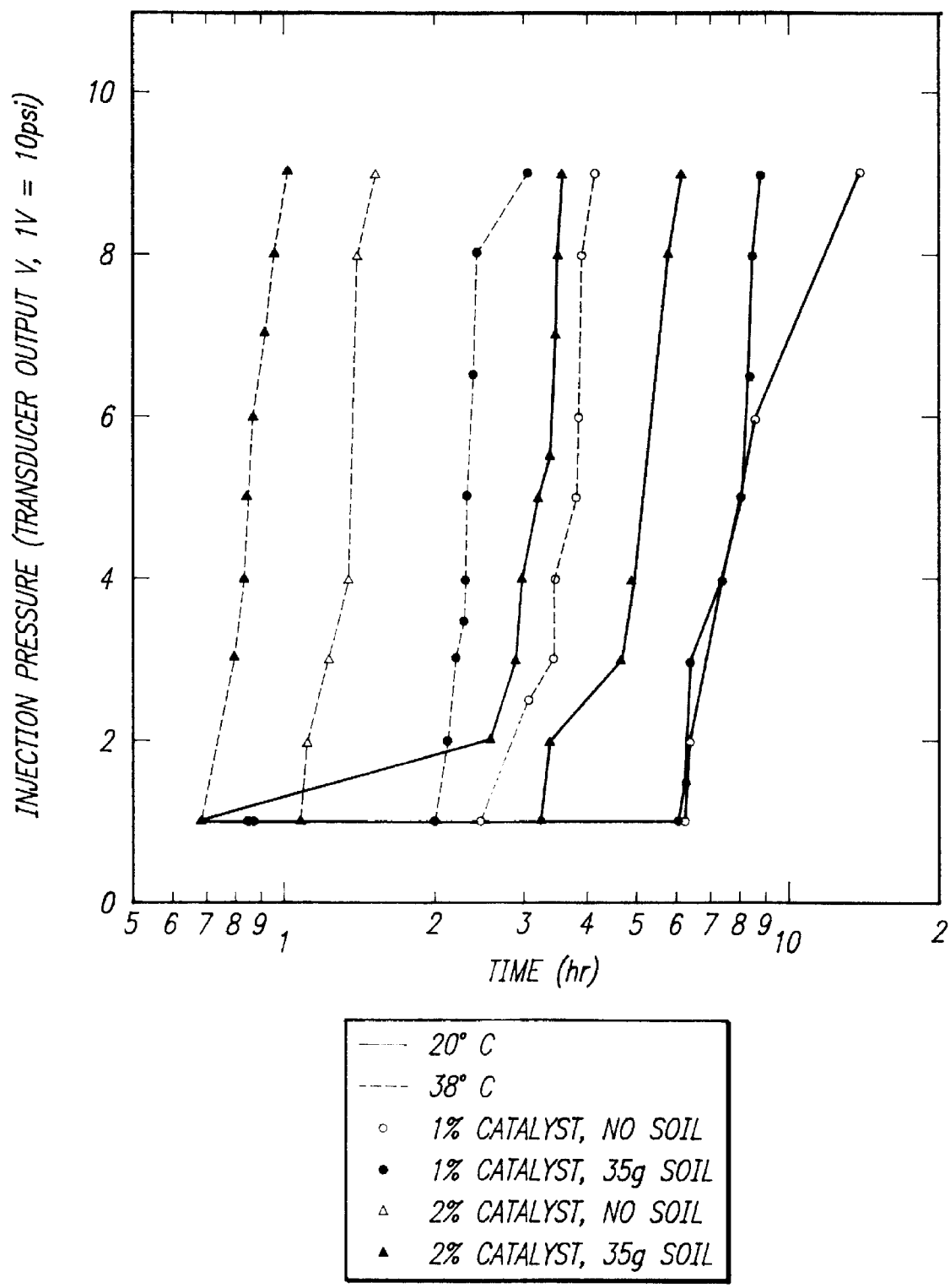
FIG. 13 is a graph showing the effect of GFA soil, temperature, and catalyst concentration on the gelling of PSX-10 grout, as observed in jar tests.

For this experiment, Nyacol 1440 which is manufactured at 40% nominal silica solids concentration was diluted to 20% (i.e., ½ strength) seen as (Δ-Δ) in FIG. 6, and 13% (i.e., ⅓ strength) seen as (x-x) in FIG. 6) with distilled water. Dilutions of Nyacol 140 were injected into 0.91 m (3 ft) long Hanford sandpacks, the injection pressure was monitored and effluent was collected. The injection rate through a $1.27 \times 10^{-4}$ m$^2$ (0.196 in$^2$) cross section was decreased proportionally to the $-\tfrac{2}{3}$ power, seen as (0-0) in FIG. 6, of time to simulate the advance rate of the front of a spherical plume of colloid injected at a constant rate from a point source.

The results from two injections are shown in FIG. 6. FIG. 6 shows injection of diluted colloid Nyacol 1440 with no added brine into Hanford soil columns.

As seen in FIG. 6, when the colloid was diluted with distilled water down to 20 wt % solids, i.e., 50% strength of the suspension, the gelling in situ resulted in 0.69 MPa (100 psi) injection pressure before grout penetrated to the outlet of the sandpack. But when the solids content was reduced to 13 wt %, i.e., 33% strength of the suspension, the injection pressures were moderate, indicating no significant gelation during the time of injection. The collected effluent also gelled within 3 days.

The sandpacks injected in these experiments were dissected afterward to observe where the gelling had occurred. In the case of 20% solids, gelling occurred between 0.6 and 0.87 m, i.e., the frontmost ⅓ of the sandpack. In the case of 13% solids, gelling occurred between 0.45 and 0.91 m, i.e., the frontmost ½ of the sandpack. These observations are consistent with the idea that the more concentrated the colloid, the more effectively it displaces the divalent ions.

The results show that a grout injection can be designed in which diluted colloid is injected initially, followed by the injection of a full-strength grout system with high solids and added brine. This results in a plume that combines a relatively high strength gel in the critical area of interest near the injection point and a weaker gel at the front farther from the injection point. Divalent ions in the soil are entrained in the dilute colloid and displaced toward the front, where they contribute to desirable slow gelling rather than causing undesirable rapid gelling near the injection point.

Use of Colloidal Silica Stabilized by an Alkyl-Ammonium Hydroxide

As mentioned previously, a typical colloidal silica such as Nyacol 1440 is stabilized by the addition of NaOH or $Na_2O$. As shown in FIG. 5, the Na ions present in the colloid are exchanged for divalent ions, typically calcium present in the soil, and the released divalent ions cause premature gellation.

This problem is solved by designing a grout that retains the advantages of CS grout, such as low cost, low initial viscosity, and controllable gel time, without the disadvantage of rapid gelling when injected into soils containing divalent ions, or without the need to preflush. The rapid gelling results from readily exchangeable Na ions in the colloid, and the Na ions are there because of the need to stabilize the colloid at high pH. When the high pH is produced by a strong base that does not cause release of divalent ions, the divalent ions are not released, and the problem of premature gelling is eliminated. An example of such a base is tetraalkylammonium hydroxide (TAAH), which does not cause divalent ions to be released because tetraalkylammonium ions are too large, and too slow defusing, to be exchanged. Other ammonium hydroxides substituted with lower alkyl having 1–3 carbons are equally suitable.

Use of Colloidal Silica Grout with a Combination of NaCl and NaF Brine

The experiments discussed above confirmed that preflushing the soil was effective in eliminating the gel-accelerating effect of soil on CS grout. At contaminated sites, however, injection of any liquid, such as an ion-exchanging solution for soil preflushing, other than the grout, is discouraged because of the possibility of mobilizing contaminants in the subsurface. This dictated the development of CS systems which did not require soil pretreatment. For an initial test of this approach, gel-time jar tests with and without added soil were conducted with NaF instead of NaCl. Results are shown in FIG. 7.

Figure 7:
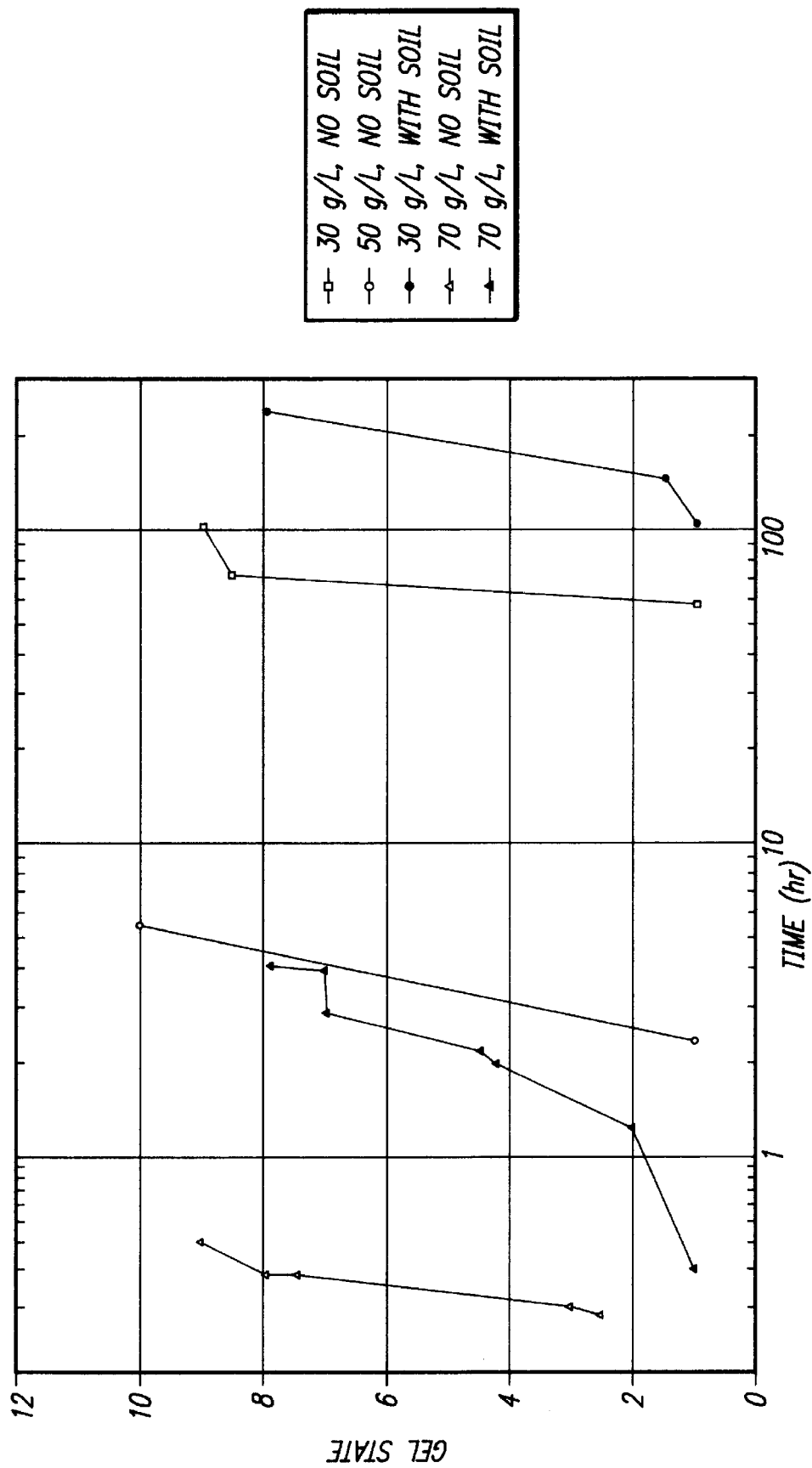
FIG. 7 is a graph illustrating the effect of soil on gelling of a colloidal silica grout containing NaF instead of NaCl.

FIG. 7 illustrates the effect of Hanford soil on gelling of colloidal silica grout containing NaF instead of NaCl. These results are comparable to FIG. 4. In FIG. 7, NaF instead of NaCl is used to induce gelling. Hanford soil retards, rather than accelerates, this gelling. This is because Ca ion is precipitated as insoluble $CaF_2$. Additionally, other divalent ions present in the soil, such as magnesium, are advantageously complexed with fluoride.

Figure 8:
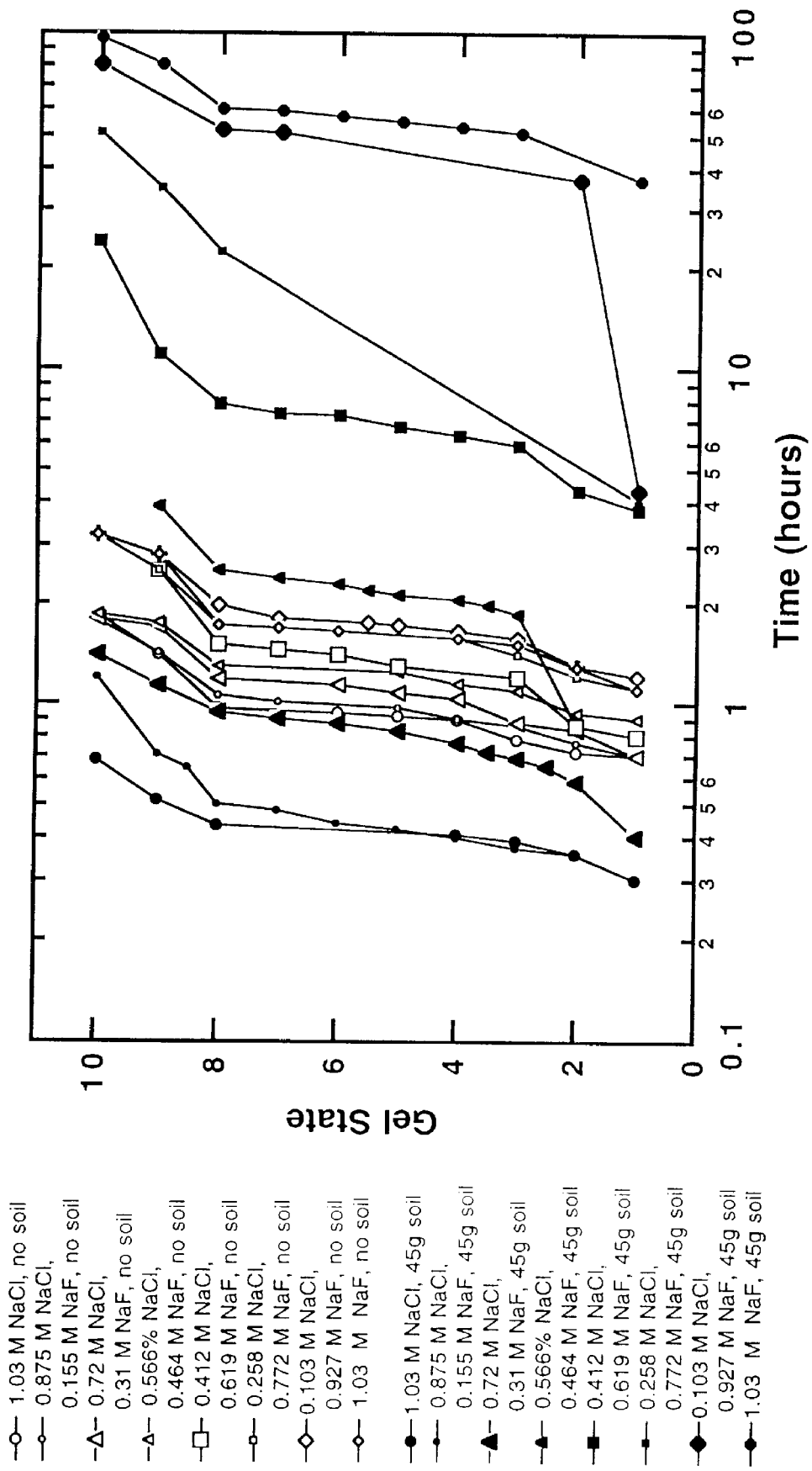
FIG. 8 is a graph showing gel curves for Nyacol 1440 grout with and without Hanford sand. The grout is prepared with 1.03M brine ranging from 100% NaCl to 100% NaF.

A series of grout formulas was tested, as seen in FIG. 8 both with soil and without soil. All grouts were made by mixing 5 parts (by volume) of Nyacol 1440 with 1 part of 1.03M brine. The brines ranged from 100% NaCl to 100% NaF. FIG. 8 shows the results of two series of jar tests, without soil (solid lines), and with Hanford sand in a soil-CS ratio of 10 g:24 ml (dashed lines). Without soil, the gel-times were approximately equal for all the grouts. This was to be expected because the ionic strength, and therefore the compression of the double layer which permits colloidal particles to approach each other closely enough to gel, is the same in all cases.

When the same series of grouts were then tested with Hanford sand in a soil-CS ratio of 10 g:24 ml. As seen in FIG. 8, results show that the soil caused the same gel accelerating effect in a CS-NaCl system as seen in FIG. 4 for NaCl system. But as an increasing proportion of $Cl^-$ is replaced by $F^-$, the gelling rates decrease, and soil seems to have a delaying rather than accelerating effect. This is due to the fact that $Na^+$ ions are exchanged for $Ca^{2+}$ on the soil clays, but the released $Ca^{2+}$ ions are immediately removed by precipitation as $CaF_2$, and are unable to induce rapid gelling of CS. Thus the higher the $F^-$ to $Cl^-$ proportion, the fewer cations are available to induce gelation and the slower the gelation rate in the Hanford sand.

To test whether this strategy could be applied in the field, a column experiment was conducted using Nyacol 1440 with a gelling agent (brine) consisting of a solution 0.77M in NaF and 0.26M in NaCl (i.e., 1.03M in Na, with 75% of the anions being $F^-$ and 25% $Cl^-$). The 87 cm long column was not preflushed, and the injection rate was set constant at 0.5 pore volume per hour, so that the first effluent emerged after 2 hours of injection.

Figure 9:
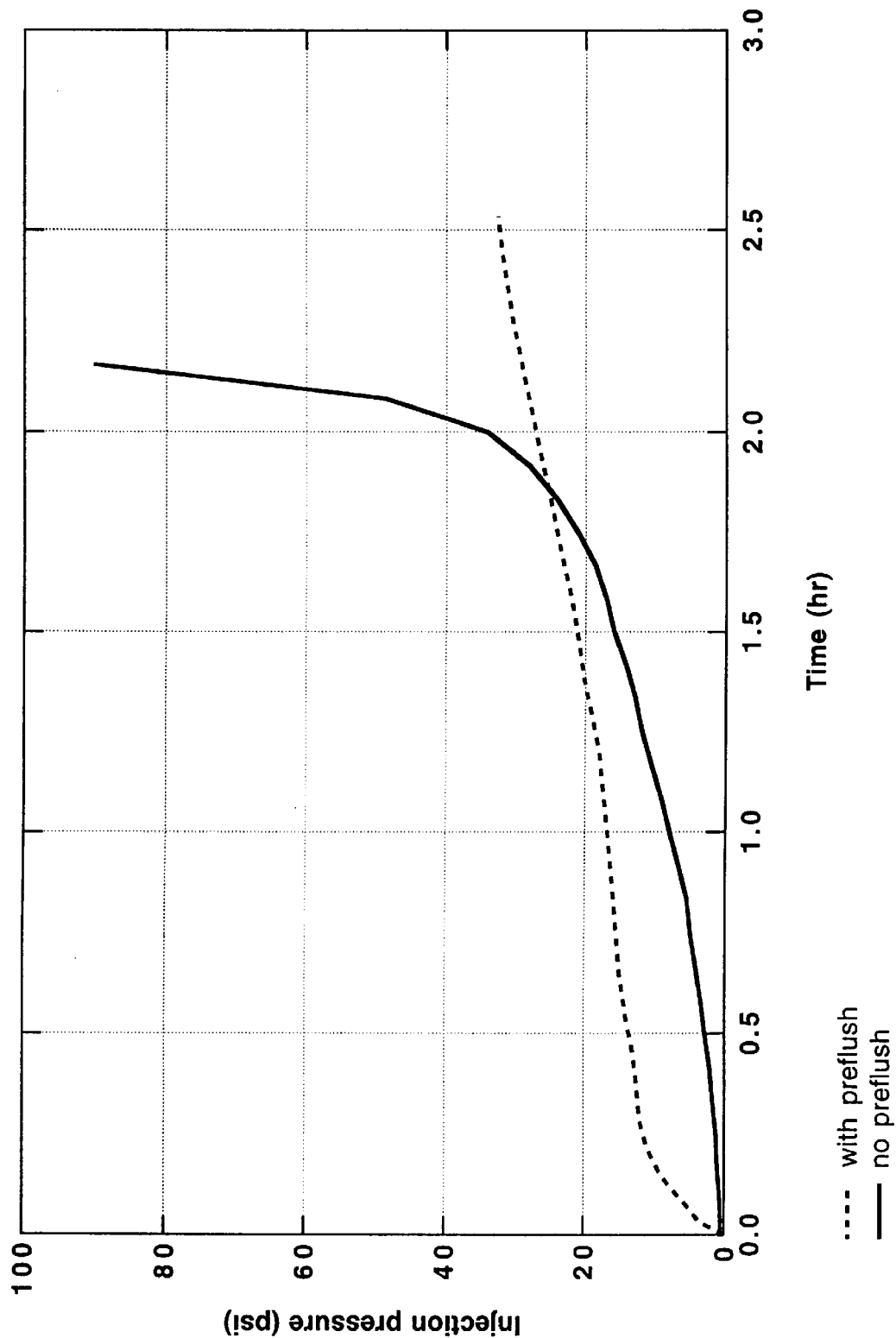
FIG. 9 is a graph showing injection pressures required to inject Nyacol 1440 grout: containing 0.77M NaF and 0.26M NaCl into Hanford sand, with and without preflushing.

FIG. 9 shows the evolution of the injection pressures with time. The curve marked with open circles shows that, with no preflush, when CS grout gelled by combination of NaF and NaCl was injected, the injection pressure remained low for almost 2 hours. This shows that the substitution of NaF for NaCl was effective in removing the Ca ions by precipitation, but as the grout front advanced, the F was depleted until only NaCl remained in the grout. The ratio of NaF to NaCl was too low to permit grout to be injected the full 87 cm through Hanford sand.

However, the results of this experiment, combined with the results shown in FIG. 8, show that a successful ratio can be selected to permit CS grout to be injected into Hanford sand, and gel controllably without need for a preflush.

Use of Alumina-modified Colloidal Silica to Counteract the Gel-Accelerating Effect of Soil Addition The particle charge induced by high pH in base-stabilized CS systems (such as the Nyacol 1440) is temporary in the sense that it can be increased, decreased, removed, or even reversed according to the pH value. In a new CS formulation, the CS is stabilized by a permanent particle charge produced by isomorphic replacement of Si by Al on the particle surface. In the resulting colloidal alumina silica (CAS) the charge is not pH dependent and it is even more environmentally benign because it is stable at a near-neutral pH of 6.5.

Figure 10:
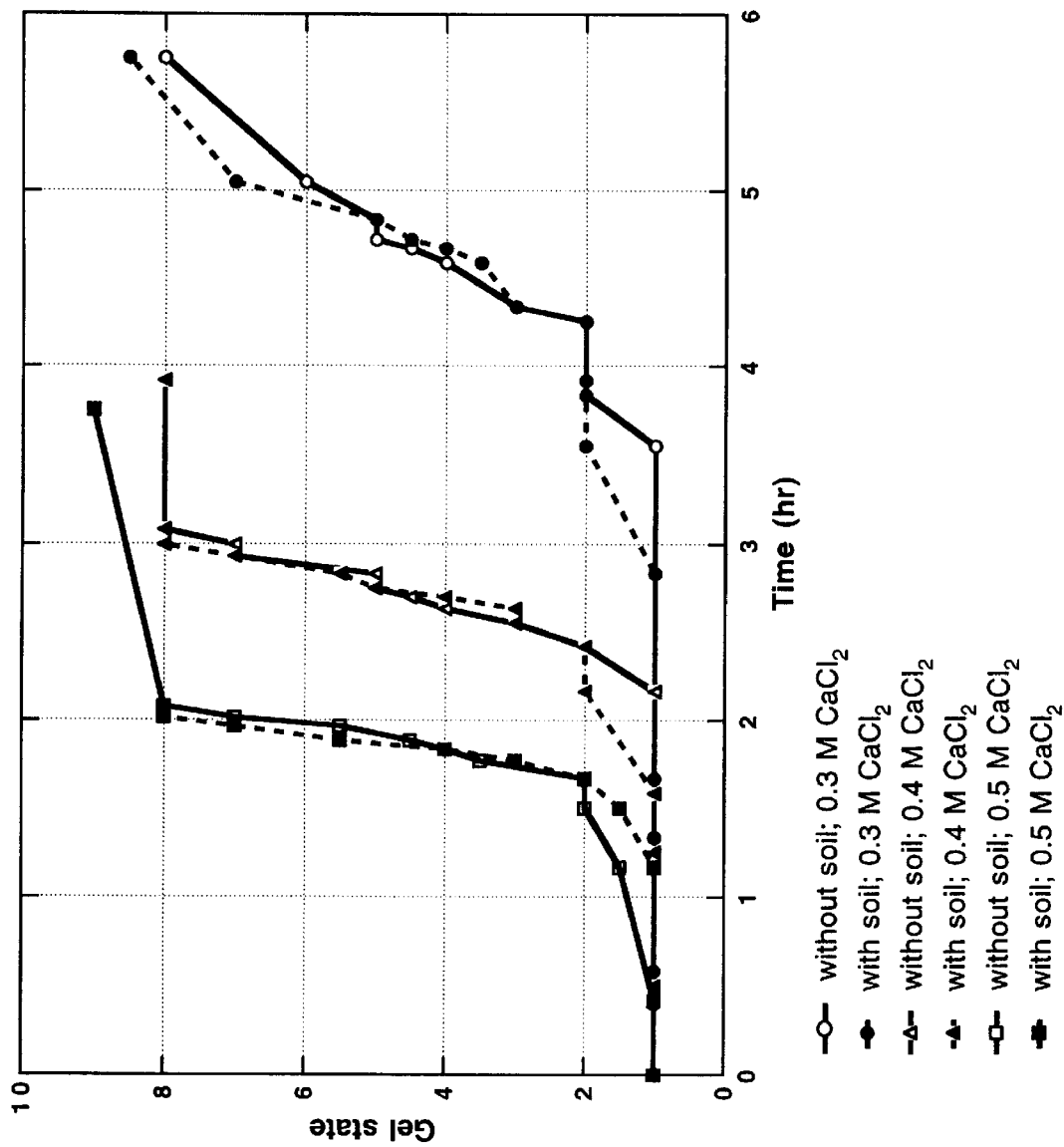
FIG. 10 is a graph illustrating the effect of Hanford soil on the gel-time of alumina-modified colloidal silica with different concentrations of calcium chloride brine.

Gel-time jar tests on Nyacol DP5110 and the CAS developmental product appears in FIG. 10.

Figure 15:
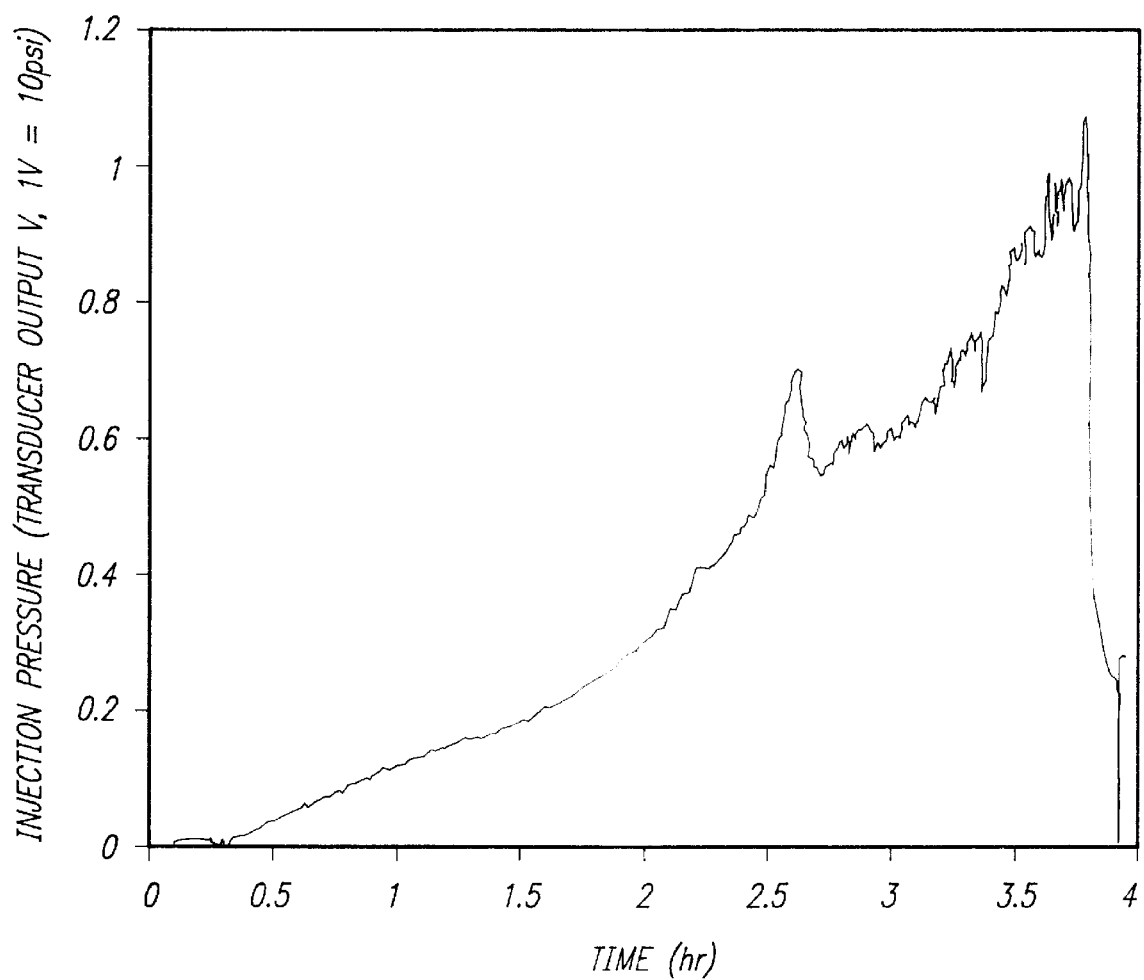
FIG. 15 is a graph showing that DP-5110 colloid alumina silica (CAS) grout with 0.4M $CaCl_2$ can be injected into Hanford sand without requiring excessive injection pressure.

FIG. 10 shows the effect of GFA soil on the gel-time of surface alumina modified colloidal silica Nyacol DP5110. For this experiment, 10 g of soil was added to 24 mL of grout. As seen in FIG. 10, CAS gelled with NaCl brine has gel-times that are unacceptably long for the majority of applications, but practical gel-times (1–10 hours) are achieved with a $CaCl_2$ gelling agent (brine). In addition, by using grout containing $Ca^{2+}$ ions, the release of $Ca^{2+}$ from clays in the soil by ion exchange ceases to be a problem. The principal advantage of using DP 5110 is that its gelling rate is relatively, although not totally, unaffected by soil. FIG. 10 shows gel-time jar tests with and without soil. No acceleration is evident in the initial tests with a soil-CAS ratio of 10 g:24 ml. As with the other colloidal silica (CS) grouts, DP5110 was injected into an 87 cm long column packed with Hanford sand, at a rate of 0.5 pore volumes (PV) per hour. Injection pressure was measured and results are as shown in FIG. 15. Injection pressure of neutral colloidal silica DP 5110 in a mixture with calcium chloride, without pH adjustment, was injected into 87 cm column containing Hanford sand and the injection pressure and time were followed.

Results are seen in FIG. 15. As seen, the pressure increased only slowly during the first 2 hours evidencing about 2 hours gelling time of this grout. After 2 hours effluent emerged and the injection pressure became much higher showing that the grout was gelled. These results confirm that CAS grout can be injected into Hanford soil without premature gelling.

B. Polysiloxane Grout Gelled by Cross-linking

The second group of grouts developed specifically for this invention are polysiloxanes (PSX-10). The polysiloxane 2-7154-PSX-10 used in the field test was developed by Dow Corning especially for this application. The final # "10" in the new polysiloxane designation refers to the viscosity, which at 10 cP is low enough to allow penetration into otherwise ungroutable fine soils using a conventional injection equipment without any modification.

The PSX-10 grout system typically consists of five components but may consist of fewer components or may have added other components:

(1) a di-vinyl-terminated polydimethylsiloxane polymer;

(2) a di-hydrogen-terminated polydimethylsiloxane polymer;

(3) a cyclic polyvinylmethylsiloxane crosslinker;

(4) a catalyst; and (5) a retardant inhibitor to prevent rapid cross-linking when the catalyst is first added.

Examples of the catalysts are platinum, palladium and other such compounds and their derivatives. The retardants are represented by compound bis (2-methoxy-1-methylethyl) maleate manufactured by Eastman Chemical Co., Rochester, N.Y. Depending on the length of the desired gel-time, additional amounts of inhibitor and/or catalyst may be added.

Components 3, 4, and 5 are present in very small amounts. Cross-linking occurs when reactions occur between the hydrogen terminations and the cyclic: or terminal vinyl groups.

As the polymer crosslinks, it changes from a Newtonian fluid to a viscoelastic fluid to an elastic solid. We will use the term gelling to describe this process although the mechanism is different from the gelling of CS described previously.

Figure 11:
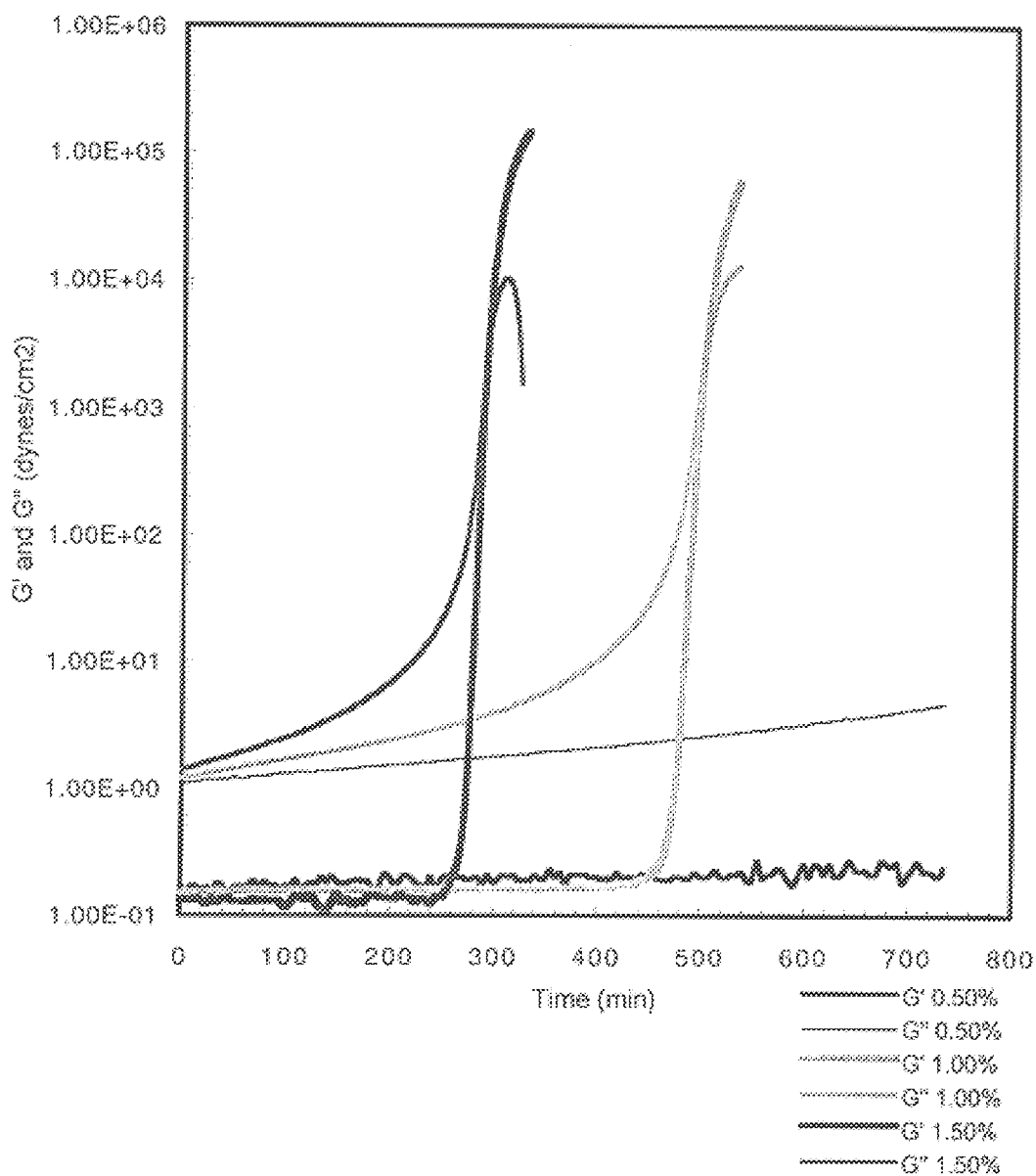
FIG. 11 is a graph of measured elastic modulus G' and viscous modulus G" measured during the gelling of PSX grout with various levels of added catalyst.

Viscosity data measured with the Rheometrics dynamic spectrometer for PSX-10 during gelling with various catalyst concentrations are shown in FIGS. 11. FIG. 11 illustrates viscous and elastic moduli and complex viscosity of PSX-10 grout during gelling, with catalyst concentration ranging from 1 to 2%. The Figure shows Rheometric dynamic spectrometer data and separates viscous G" and elastic G" components of viscoelasticity. When the elastic component (o-o) exceeds the viscous component ($\diamond$-$\diamond$), then the liquid gels.

Additionally, the results in FIG. 11 show that the gel time for PSX-10 is controlled by the level of the addition of catalysts.

Figure 12:
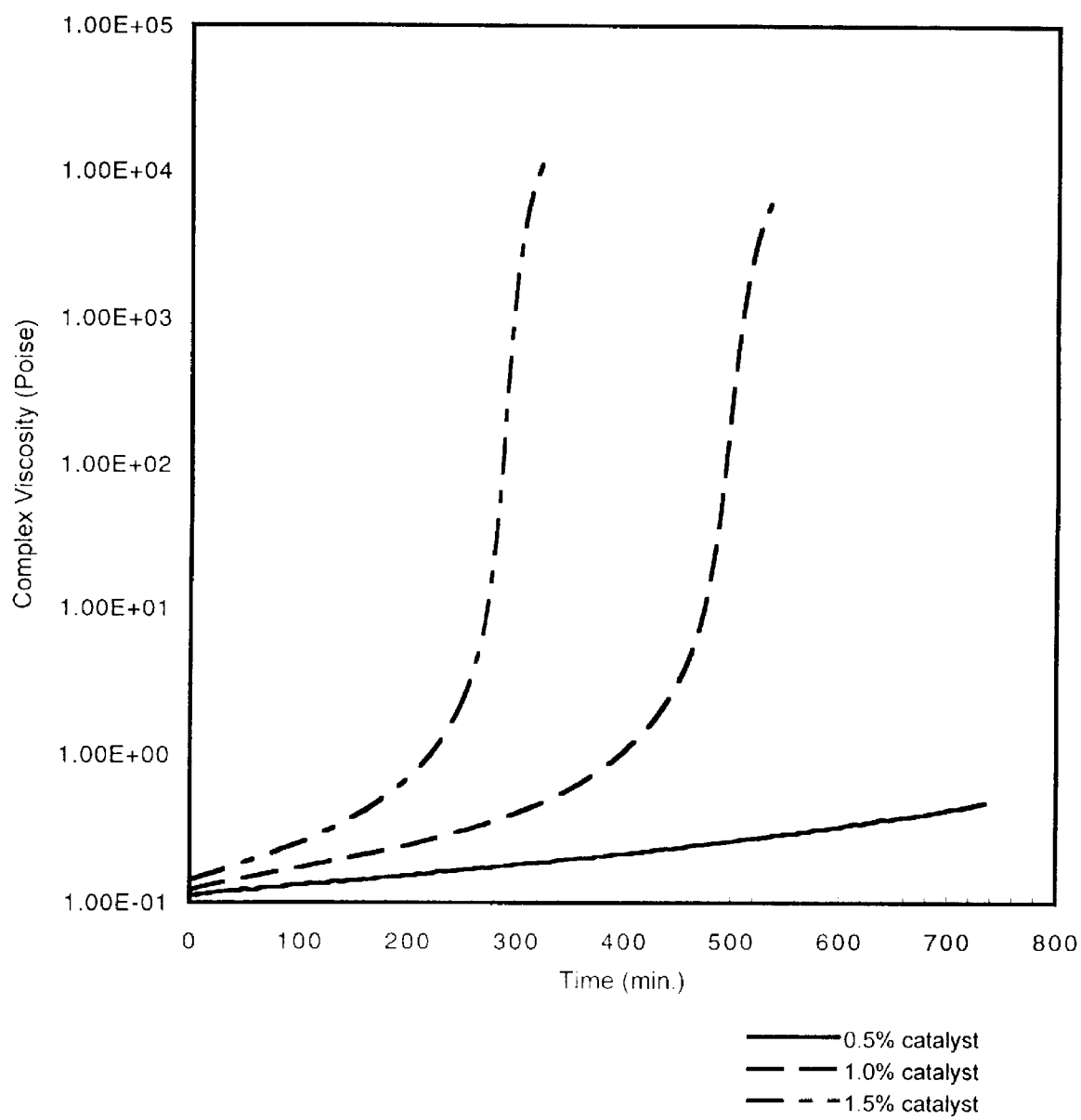
FIG. 12 is a graph showing effective complex viscosity of PSX grout calculated from data shown in FIG. 11.

FIG. 12 represents the calculated results from the data of FIG. 11 and shows the effective complex viscosity calculated from the data in FIG. 11.

Gel-state curves were also developed for PSX-10 at various temperatures and catalyst concentrations, with and without Hanford soil. Data are shown in FIG. 13 for gel-time jar tests at 20° C. (solid lines) and 38° C. (dotted lines), with catalyst concentrations of 1% (0-0) and 2% by weight (Δ-Δ). The effect of temperature was studied because of the range of the expected temperatures that were expelled during field trials. As seen in FIG. 13, the lower temperature of 20° C. used resulted in slower gelling while the presence of the larger amount of catalyst decreased the gelling time.

From results seen in FIGS. 11–13 it is obvious that the main means to control the gel-time is by varying the amount of catalyst and by controlling the temperature. However, there is a lower bound to the catalyst amount, below which gel formation does not occur. When longer gel-times are desired, varying the amount of the retardant offers an additional means of control as seen in (Table 2).

Table 2 shows the effect of the retardant and the catalyst on the gel-time and on consistency of polysiloxane. Various amounts of the catalysts and inhibitors and their combinations were compared. Results show that the varied amounts of retardant and/or catalyst results in the polysiloxane grout to be complete ungelled, very viscous, sticky, rubbery or rigid.

TABLE 2

Effect of Inhibitor (Retardant) on the Gel-Time and Consistency of PSX-1O in Jar Tests

| % Catalyst (by Weight) | % Inhibitor (by Weight) | Gel-Time | Results |
|---|---|---|---|
| 1.66 | 0.0 | 6 hours | Rigid, rubbery gel |
| 1.66 | 0.25 | 26–29 hours | Rubbery, slightly sticky gel |
| 1.66 | 0.48 | 70 hours | Very sticky, under cross-linked gel |
| 1.62 | 1.0 | >16 days | Very viscous liquid |
| 1.62 | 2.0 | n/d | Completely ungelled | n/d = not detected even after 16 days.

After studying the effects of the retardant and evaluating all options, it was concluded that the 2-hr gel-time needed for field test could be easily accommodated by varying only the catalyst. GFA Soil has a slight accelerating effect on the gelling of PSX, but the degree of acceleration can be easily compensated for by adjusting the catalyst concentration.

Figure 14:
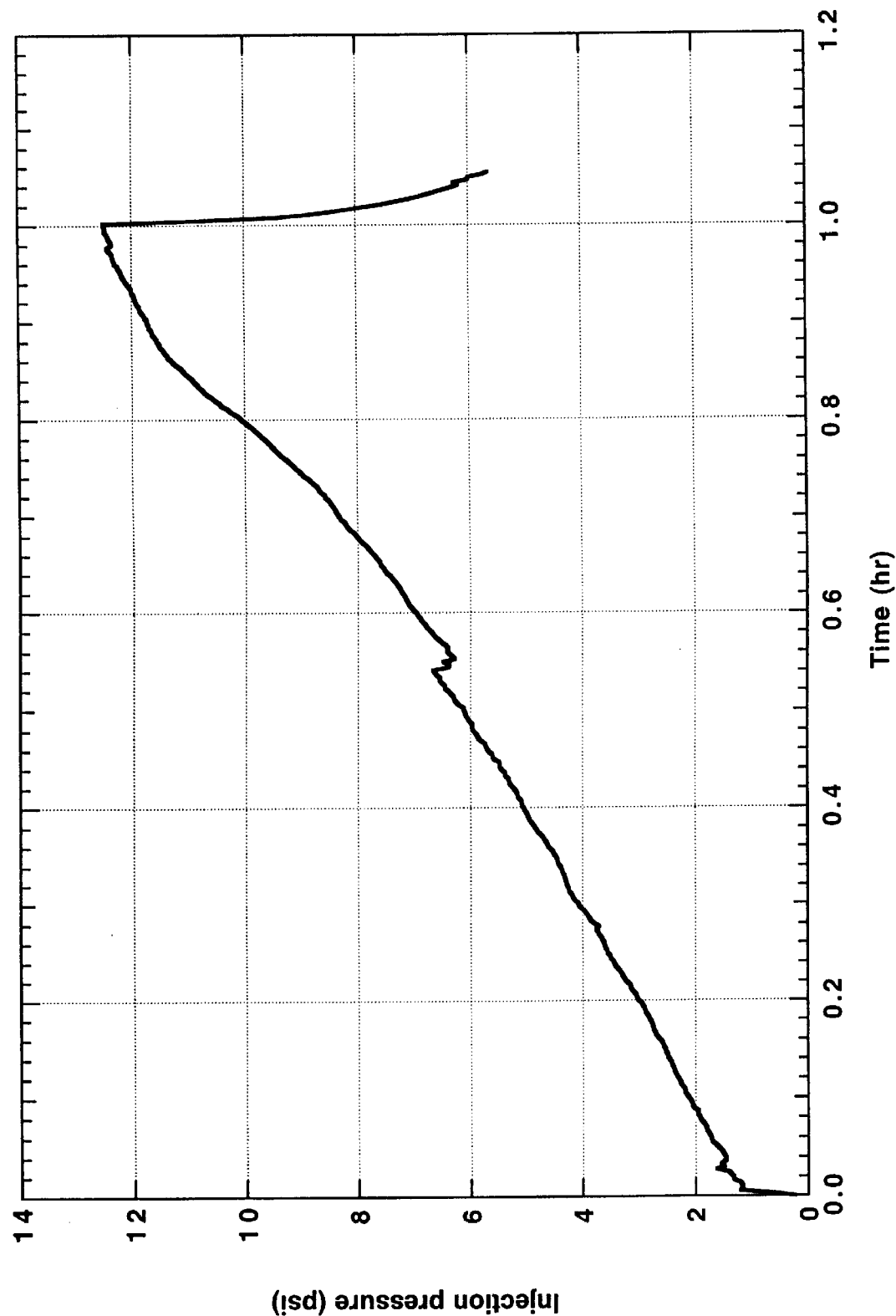
FIG. 14 is a graph showing that PSX-10 grout can be injected into GFA soil without requiring excessive injection pressure.

As discussed above, the pressure under which the grout is injected is important in evaluation of the premature or normal gelling and gel-time. FIG. 14 shows results of a column test injection of PSX-10 with 1% catalyst into GFA soil. FIG. 14 shows that PSX-10 with 1% catalyst can be injected into GFA soil without requiring excessive injection pressure.

C. Polybutene Grouts

Polybutenes form a single component grouts. Polybutenes are very temperature sensitive and solidify by cooling. Polybutenes are available from Exxon Chemical Co., Houston, Tex., under the trade name Parapol (molecular weights ranging from 450 to 2500) and Vistanex (molecular weights in the range 20,000 to 40,000). There is no actual temperature at which polybutene solidifies. However, it's viscosity increases by a factor of 133 with a 64° C. drop in temperature, while for water, the same drop in temperature increases the viscosity only by a factor of 3.

A blend of 14% Vistanex LM-MS-LC (MW=40,000) and 86% Parapol 450 (MW=450) was tested. The viscosity ranged from 300 mPa-s at 68° C. to 10,000 mpa-s at 21° C. when its viscosity is high enough to seal the contaminants and to form the subsurface barrier. Pure Parapol 950 (MW=950) was also tested. Its viscosity ranged from 300 mpa-s at 84° C. to 30,000 mpa-s at 22° C.

D. Field Trials

Figure 16:
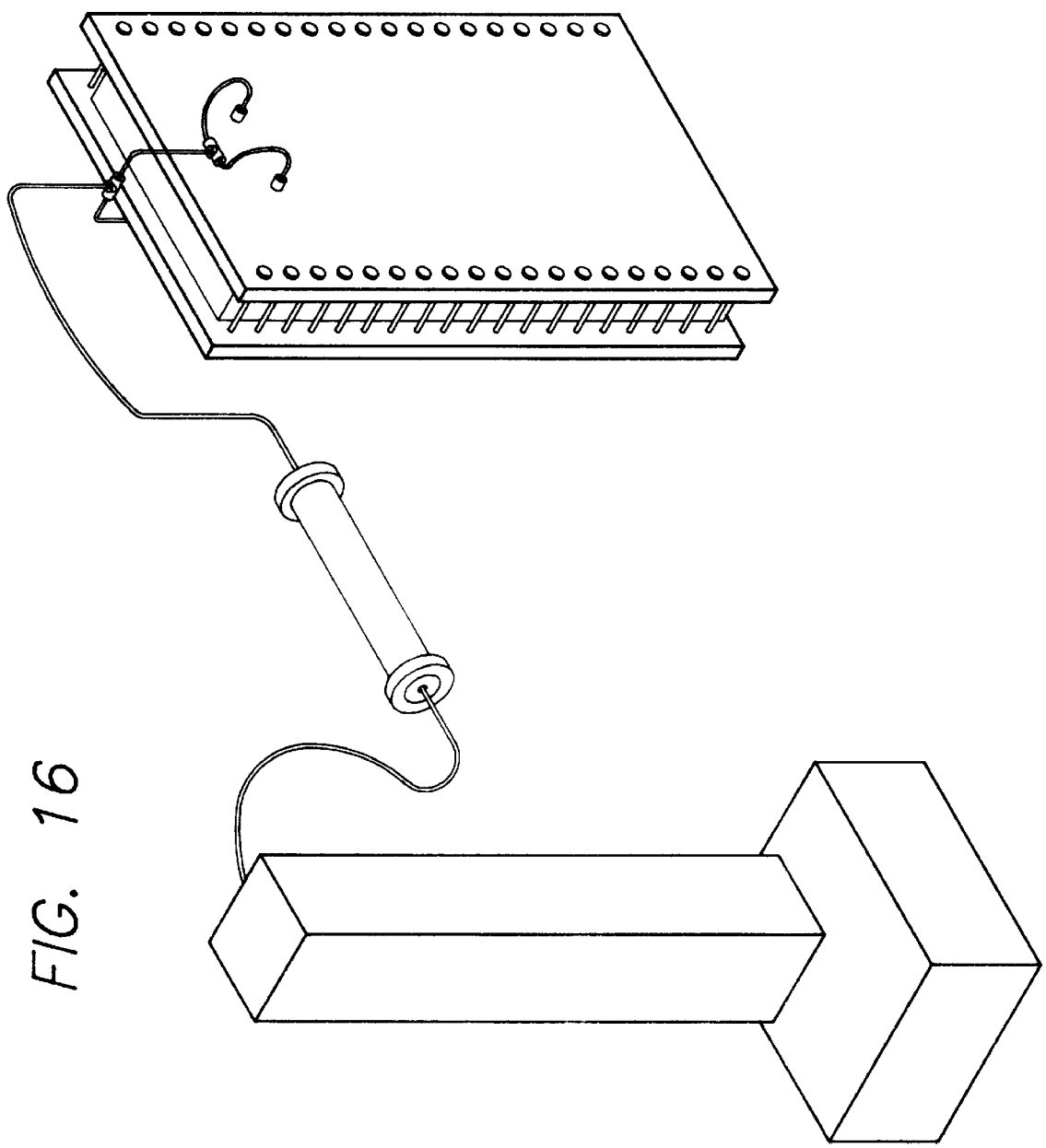
FIG. 16 shows a test apparatus used in experiments for testing the numerical simulation of grout injection in which PSX was injected into Hanford sand through two wells. The two plumes have merged and solidified.

The utility of this invention was determined both in laboratory and field conditions. For laboratory experiments, a sand column having two inlets for studying merging of two plume injections was used. The column and accompanying testing components are seen in FIG. 16.

During the laboratory tests, three groups of grouts, colloidal silica, polybutene and polysiloxane, have been developed that satisfy the requirements of low initial viscosity and controllable gel time in soil. For alkaline colloidal silica, gelling was accelerated uncontrollably by calcium in the soil unless the calcium was displaced by a NaCl pref lush. For neutral colloidal silica stabilized by surface modification (Nyacol DP5110), no preflush was necessary.

Additionally, a numerical simulator has been developed that incorporates the mixing, if the grout is aqueous, gelling, cross-linking and cooling solidification of grout. The simulator was used to plan laboratory experiments and field injections. In a sandbox experiment, the simulator accurately calculated the final shape and location of a pair of plumes of PSX grout.

A field injection of colloidal silica and polysiloxane grout was performed under the following conditions and with the following results.

The grout formula of the three batches used in the field trial was:

(1) Batch 1: 360 lb PSX-10,6.18 lb catalyst=1.72%
(2) Batch 2: 360 lb PSX-10,5.61 lb catalyst=1.56%
(3) Batch 3: 320 lb PSX-10,5.07 lb catalyst=1.58%

As with the colloidal silica, the low temperatures during the field trial delayed cross-linking beyond the planned duration of time. Observation of grout samples in jars suggested that the grout remained mobile longer than 5 hrs. This probably caused greater spreading of the grout in the subsurface than would have occurred if the grout had become immobilized after the 2-hr design gel-time.

The materials were injected at depths of 10 ft to 14 ft in a heterogeneous unsaturated deposit of sand, silt, and gravel typical of many of the arid cleanup sites and particularly analogous to the conditions of the Hanford site. Successful injection of both grouts by commercially available chemical grouting equipment, and the tube-a-manchette technique, was demonstrated. Excavation of the grout bulbs permitted visual evaluation of the permeation of the grout as well as sample collection. Measurements made during grouting and subsequent observations and measurements after excavation were consistent in showing a decrease in injectivity of the grout with depth due to an increase in silt and clay in the formation.

Both grouts effectively permeated all of the formation. Despite the extreme soil heterogeneity, both the CS and the PSX created fairly uniform plumes, indicating that the potential problem of flow along preferential pathways of high permeability, such as a gravel bed overlying a tight, silty or clay-like zone, was overcome. Some concentration of the grouts in particular zones was evident. Within the grouted plumes, both large and small pores seemed to be grouted.

CAS grouted large pores and managed to seal small pores. Grout also penetrated and sealed fractures and large pores in the clays. In the presence of very open zones, such as gravels with cm-sized pores, it did not fully cover the open spaces, but seemed to have sealed access to them. CS did not seem to impart substantial structural strength to the soil but it gave enough strength to allow vertical sections of the soil to be sealed.

PSX was particularly successful in grouting the extremely heterogeneous subsurface at the treated site. It managed to penetrate large and small pores and to create an almost symmetric plume, grouting and sealing gravels, cobbles, sands, silts, and clays. It filled and sealed large pores and fractures, as well as accessible small pores in the vicinity of these pores/fractures. The degree of fill was very high. Even in the case of extremely large openings in open zones, it coated the individual rocks in the gravel and sealed access to and egress from these zones.

Polysiloxane grout imparted structural strength and elasticity to the grouted soil volume, and was relatively easy to identify in the subsurface. PSX gave sufficient strength to very loose gravels without any cohesiveness to be able to form vertical walls. Even more interestingly, PSX managed to invade clays and silts. This is the first reported incidence of such a behavior. Grouting of clays and silts had not been achieved before and this is the first material that managed to accomplish it.

UTILITY

The current invention is useful for formation and emplacement of permanent subsurface barrier systems for prevention of the spread of contaminants during treatment operations, during storage of contaminants or during containment of contaminated soils or sands. The invention is suitable for containment of radioactive or hazardous waste or leaks thereof from the primary storage tanks. The primary use of this invention is thus an injectable barrier system for containment isolation in the subsurface. Another use of the new grouts is in investment casting and for preparation of foundry molds, where sand molds are hardened by colloidal silica. Other uses include, but are not limited to, soil stabilization prior to excavation, groundwater control, larvae stabilization, sealing of basements, termite control or for stabilization of ceramics prior to firing.

EXAMPLE 1

Viscous Liquids Useful for Formation of Impermeable Subsurface Barriers

This example describes viscous liquids and other materials used for laboratory and field studies of subsurface barriers formation.

The viscous barrier fluids include one type of PSX (2-7154-PSX-10) obtained from Dow Corning, Midland, Mich. and for two types of colloidal silica (CS) (Nyacol 1440 and Nyacol DP 5110) obtained from PQ Corporation, Valley Forge, Pa. All the barrier fluids tested are environmentally benign and carry no warning label requirements.

Nyacol 1440 is an alkaline-stabilized CS, with a pH of 10.6. Its nominal particle size is 14 nm and silica content is 40%.

Nyacol DP 5110 is a CS in which silica on the particle surface has been partly replaced by alumina. Its solid content is 30% and its pH is 6.5

A technical grade $CaCl_2$, HB-23 (Hill Bros. Chemical, San Jose, Calif.) was used for the brines for gelling CS in tests and the field demonstration. This is nominally 35% $CaCl_2$, which corresponds to a 4M solution.

PSX-10 is a polydimethylsiloxane, divinyl or dihydrogen terminated to provide active sites for cross-linking. It is formulated by the manufacturer with a crosslinker (a small cyclic siloxane molecule) that can react with the terminations of the long chains, in the presence of an organically-coordinated platinum catalyst (the amount of platinum is small and does not contribute significantly to the cost). The polydimethylsiloxane and crosslinker are delivered already mixed, but unreacted. Catalyst is added by the user at the level necessary to achieve the desired gel-time.

Polybutenes are available from Exxon Chemical Co., Houston, Tex., under the trade name Parapol (molecular weights ranging from 450 to 2500) and Vistanex (molecular weights in the range 20,000 to 40,000).

EXAMPLE 2

Methods Used for Gel-time Measurements

This example describe the methods used for determination of gelling time and gel-time measurements.

Experiments to control the gelling rate of grouts were conducted in jar tests and viscometry, both in the absence of soil and in the presence of soil. In the jar tests, the gel-time of all materials was measured by a qualitative visual according to *SPE Reservoir Engineering*, 346–352 (August 1990).

Gel states were assigned the following numbers:

1 represents no change from initial viscosity;

2 increased viscosity, still Newtonian;

3 through 8, increasing yield stress and elasticity of non-Newtonian viscoelastic fluids;

9 rigid gel;

10 ringing rigid gel; and 11 rigid gel.

For further details, see Table 1.

Although crude, the jar test has the advantage that the gel state can be measured in the presence of soil, which cannot be done in viscometric methods. However, jar tests do not reproduce the ratio of soil solid to injected liquid that would be obtained in the field.

To examine gel time under those conditions, grout was injected into packed columns of soil as seen in FIG. 16, while the injection pressure was monitored. The column dimensions and flow rate in these tests were designed to approximately reproduce the flow rates that would occur in a planned field test injection. To obtain data needed for simulations, selected grout formulas were also measured in a Contraves rheometer or in a Rheometrics dynamic mechanical spectrometer; for these tests soil was not included.

In column gel-tests barrier liquids are injected into the sandpacks. The inlet and outlet tubes, of which at least one is flexible, are clear and contain water. To monitor gelling, the burette is raised or lowered to impose a hydraulic gradient across the sandpack. The rate of decay of the hydraulic gradient decreases, i.e., permeability of the grouted sandpack decreases as the grout gels.

In the field test injection, 1 $m^3$ of grout was injected for 2 hours at a constant volumetric rate from a point source into a soil with 36% porosity. This yields a spherically symmetric injection with a radius of 87 cm. In the field test, the grout front advances at a power-law decreasing rate. In the column tests, the injection rate was held constant at 1.4 ml/min through a 2.54 cm i.d. column. This resulted in grout reaching the outlet of the 87 cm long column in 2 hours, thus reproducing the grout flow on an average basis.

Numerical Simulation of Injection

When grout is injected into unsaturated soils, the grout plume slumps under gravity and spreads due to capillary forces, while its viscosity increases and it finally solidifies. In the case of CS, the grout is initially miscible with pore water but eventually it forms a separate phase, while in the case of PSX, the grout is a separate phase at all times. The purpose of grouting is achieved when the grout solidifies, thus changing the original porous medium to a new one with lower porosity and permeability.

A numerical mode simulates these flow and gelling processes, with the aim of predicting both the eventual location of the plume and the properties of the new porous medium formed by grouting. The new porous medium can then be described for simulation of subsequent grout injections. The processes of gelling, mixing, and solidification are represented by a Gel-time Curve, Mixing Rule, and Solidification Model.

The gel time curve specifies the change of viscosity with time. Any explicit viscosity vs. time function can be used. In this invention, curves fit to the data of FIG. 3A were used. Alternatively, effective viscosity can be and was calculated from the data of FIG. 3B. This latter option is equivalent to specifying a shear rate.

CS grout is miscible with pore water. The mixing rule is used to calculate the viscosity as a function of time and mass fraction of grout in the diluted grout. With the linear mixing rule, the viscosity is the weighted average of the viscosities of water and undiluted grout at the same time. For PSX grout, which is not miscible with water, no mixing rule is needed.

The solidification model describes how the grout changes from a liquid with increasing viscosity to a solid resulting in a new porous medium. Tables 3 and 4, below, summarize how the phases are dealt with before, during, and after solidification. After solidification, a new parameter set is calculated for the grouted soil. The parameters to be recalculated are porosity, permeability, relative permeability and capillary pressure functions, and initial liquid saturation. They are basically a function of the final grout content. An initially homogeneous soil becomes heterogeneous with lower porosites and permeabilities in regions with a high final grout content. On the other hand, an initially heterogeneous soil may become more homogeneous on a scale smaller than the plume size, because highly permeable zones are clogged with grout compared to regions which are already relatively impermeable.

The mixing rule specifies grout that has been diluted with pore water. A high degree of dilution prevents certain grouts from solidifying. For CS grout, the Solidification Model assumes that all the liquid in the pore space eventually solidifies only if the colloid content in the liquid phase exceeds a certain minimum concentration. From jar tests, it was concluded that the threshold concentration for solidification is 70% for DP 5110 gelled with $CaCl_2$. PSX grout is not miscible with water, so no dilution occurs and it all solidifies. For any kind of grout, after solidification, the porosity of the porous medium is reduced by the amount of grout that solidified, the absolute permeability is reduced, and new capillary pressure and relative permeability curves are calculated. The reduction in absolute permeability is calculated by assuming that the CS grout wets the solid phase like water, i.e., partial clogging of the pore space by CS grout is conceptually similar to the permeability reduction due to phase interferences in a multiphase flow system. Since the grout-water mixture is the wetting fluid, one might take the relative permeability function of the non-wetting phase to calculate the absolute permeability of the new porous medium after solidification. For PSX grout, the PSX is assumed to wet the soil better than air but less well than water.

Due to the reduced pore sizes in the new porous medium, the capillary pressure, at any specified water saturation, of the grouted sand is expected to be greater than for the original ungrouted sand. It was assumed that the pore size distribution is shifted but that its shape is not changed. Consequently, the exponents in the commonly used characteristic curves by Brooks-Corey or van Genuchten are not modified, either.

TABLE 3

Concept and Application of Solidification Model for CS Grout

| | Major Component in Phase | | | |
|---|---|---|---|---|
| Time | Air Water | Grout | Soil | Comment |
| before solidification | gas liquid | | solid | grout and water are miscible |
| during solidification | gas liquid | solid | | apply solidification model |
| after solidification | gas liquid | solid | | new porous medium |

TABLE 4

Concept and Application of Solidification Model for PSX Grout

| | Major Component in Phase | | | | |
|---|---|---|---|---|---|
| Time | Air | Water | Grout | Soil | Comment |
| before solidification | gas | liquid 1 | liquid 2 | solid | grout and water are immiscible |
| during solidification | gas | | grout solidifies | solid | all grout solidifies |
| after solidification | gas | liquid | solid | | new porous medium |

EXAMPLE 3

A Sandbox Demonstration and Simulation

This example describes testing of one of the objectives of this invention, namely to demonstrate formation of a continuous barrier injected from parallel horizontal wells some distance apart. Another objective was to test the numerical simulator.

A small sandbox was set up and PSX grout was injected simultaneously through two wells. The injection was also simulated numerically.

The soil sample, from a semi-arid environment, was sufficiently dry (about 5% saturation) that the aqueous phase could be ignored. Two-phase modeling (PSX and air) was used, with PSX as the wetting phase. To obtain data for simulations, the hydraulic conductivity in sandpacks of Hanford soil using water was measured and the capillary pressure vs. saturation curve in a pressure cell was also measured using water. The hydraulic conductivity of the sand was $8\times10^{-2}$ cm/sec, isotropic. Constants n=1.53 and a=$7.2\times10^{-1}$ Pa for the van Genuchten equation were obtained by fitting the capillary pressure data. To estimate the capillary pressure data to estimate the capillary pressure and relative permeability curves for PSX-air in Hanford sand, the observed capillary rise of water and PSX in glass tubes was compared. The PSX rose one-half as far as water. Therefore, the pressure was reduced by a factor of 2; this factor included the combined effects of surface tension and contact angle. The value of n was unchanged.

The sandbox (FIG. 16) was 120 cm (4 ft) high, 60 cm (2 ft) wide, and 10 cm (4 inches) deep from front to back. In the sandbox experiment, two plumes of PSX were injected simultaneously. The syringe pump was used to pump water into a transfer cell, displacing PSX into a four-plex manifold that delivered grout to both ends of each of two wells.

The front and back surfaces were plexiglass to allow one to see the grout plume. Three wells (perforated ¼ inch o.d. copper tubes) extended horizontally through the front and back surfaces. Hanford sand was placed in the box by rolling a hopper with a perforated bottom back and forth over the open top of the box. To avoid disturbing the sand when installing the wells, sand was placed up to the level of the wells, and then the wells were installed, and more sand placed over the wells to the top of the box. This method of packing was not perfect, and a layer of coarser sand was visible at the front side of the box just below the level of the wells. No such coarse layer was seen at the back of the box. The properties of this layer were not measured. For simulations, the hydraulic conductivity was taken as four times as great as the rest of the sandbox, factor based on backfit trials; the capillary and relative permeability curves were adjusted holding van Genuchten's n and α constant as in the solidification model.

PSX grout with 1.25% catalyst was premixed as a batch and pumped from a transfer cell through a four-plex manifold into both ends of both wells. The penetration of the grout was clearly visible. The advance and final shape of the resulting grout plumes at the front and at the back of the box were seen, and compared to simulations. At the front of the box, where the layer of coarser sand was visible, grout first moved into the more permeable layer, but eventually was wicked into the finer sand above and below the permeable layer. Comparison of the photographs of the plumes with the simulations showed that the simulator reproduced the general shape of the injection.

What is claimed is:

1. A method for formation of subsurface barriers comprising steps:
    (a) emplacing into a subsurface a grout comprising a viscous colloid selected from the group consisting of a colloidal silica, modified colloidal silica, polysiloxane and polybutene; and
    (b) solidifying said colloid in place.

2. The method of claim 1 wherein a solidification in step (b) comprises gelling, cross-linking or cooling.

3. The method of claim 2 wherein the viscous colloid is the colloidal silica solidified by gelling caused by destabilization of the colloid.

4. The method of claim 3 wherein the gelling time is controlled by dilution, by addition of a brine, by coating with alumina or by changing a temperature of the colloid.

5. The method of claim 1 where the viscous colloid is polysiloxane solidified by cross-linking.

6. The method of claim 5 additionally comprising a catalyst or a retardant.

7. The method of claim 6 wherein the catalyst is platinum or palladium.

8. The method of claim 6 wherein the retardant is 2-methoxy-1-methylethyl maleate.

9. The method of claim 1 where the viscous colloid is polybutene solidified by cooling.

10. A method for formation of subsurface barriers comprising steps:
    (a) emplacing into a subsurface a grout comprising a viscous colloid selected from the group consisting of a colloidal silica, modified colloidal silica, polysiloxane and polybutene;
    (b) solidifying said colloid in place by gelling, cross-linking or cooling; and
    (c) controlling a timing of said solidification of step (b) by dilution of said viscous colloid, by addition of a brine, by coating with alumina, by stabilization and by changing the temperature of the viscous colloid.

11. The method of claim 10 wherein the brine is sodium chloride, potassium chloride, calcium chloride or sodium fluoride.

12. The method of claim 11 wherein a rate of gelling is controlled by preflushing the subsurface with sodium chloride brine.

13. The method of claim 11 wherein the gelling time is controlled by the injection a diluted colloidal silica.

14. The method of claim 11 wherein the viscous colloid is the colloidal silica stabilized by coating of the silica particles with alumina.

15. The method of claim 14 wherein the gelling time is controlled by addition of calcium chloride brine to the colloidal silica.

16. The method of claim 11 wherein the viscous colloid is the colloidal silica stabilized by addition of sodium hydroxide or sodium oxide.

17. The method of claim 16 wherein the gelling time is controlled by the addition of a mixture of sodium chloride and sodium fluoride brine.

18. The method of claim 11 wherein the viscous colloid is the colloidal silica stabilized by addition of an alkyl-ammonium compound.

19. The method of claim 18 wherein the alkyl-ammonium compound is tetraalkylammonium hydroxide.

* * * * *